US011337104B2

(12) United States Patent
Kim et al.

(10) Patent No.: US 11,337,104 B2
(45) Date of Patent: May 17, 2022

(54) ELECTRONIC DEVICE FOR TRANSMITTING DATA THROUGH SPLIT BEARER AND METHOD OF OPERATING ELECTRONIC DEVICE

(71) Applicant: Samsung Electronics Co., Ltd., Suwon-si (KR)

(72) Inventors: Junsuk Kim, Suwon-si (KR); Kyuhwan Yi, Suwon-si (KR); Sangho Lee, Suwon-si (KR); Soomin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,108

(22) Filed: Jul. 17, 2020

(65) Prior Publication Data
US 2021/0022032 A1 Jan. 21, 2021

(30) Foreign Application Priority Data
Jul. 17, 2019 (KR) ........................ 10-2019-0086664

(51) Int. Cl.
H04W 28/02 (2009.01)
H04W 72/14 (2009.01)
(Continued)

(52) U.S. Cl.
CPC ....... *H04W 28/0252* (2013.01); *H04W 72/14* (2013.01); *H04W 80/02* (2013.01); *H04W 84/042* (2013.01); *H04W 88/06* (2013.01)

(58) Field of Classification Search
CPC .................. H04L 45/24; H04W 24/02; H04W 28/0252; H04W 40/04; H04W 72/0446;
(Continued)

(56) References Cited

U.S. PATENT DOCUMENTS

2009/0059883 A1 3/2009 Kawamoto et al.
2011/0188377 A1 8/2011 Kim et al.
(Continued)

FOREIGN PATENT DOCUMENTS

WO 2018172542 A1 9/2018
WO WO-2018172542 A1 * 9/2018 .......... H04W 28/085
WO 2018227953 A1 12/2018

OTHER PUBLICATIONS

Jha (Dual connectivity in LTE small cell network)—loading 2014 (Year: 2014).*
(Continued)

Primary Examiner — Tuan A Tran

(57) ABSTRACT

An electronic device may include: a communication processor; and an application processor configured to transmit data to be transmitted through first cellular communication and/or second cellular communication to the communication processor, wherein the communication processor includes: a PDCP configured to support a split bearer for transmitting split data; a first RLC configured to split data received from the PDCP; and a second RLC configured to split data received from the PDCP, wherein the PDCP is configured to split data received from the application processor into data units having a preset size, identify a data processing rate of the first RLC and a data processing rate of the second RLC, and distribute the data units to the first RLC and the second RLC, based on the data processing rate of the first RLC and the data processing rate of the second RLC.

20 Claims, 29 Drawing Sheets

(51) Int. Cl.
  *H04W 80/02* (2009.01)
  *H04W 84/04* (2009.01)
  *H04W 88/06* (2009.01)

(58) Field of Classification Search
  CPC ............. H04W 72/08; H04W 72/0453; H04W 72/14; H04W 76/15; H04W 28/0278; H04W 80/02; H04W 80/06; H04W 80/10; H04W 80/16; H04W 80/08
  See application file for complete search history.

(56) References Cited

U.S. PATENT DOCUMENTS

| | | | |
|---|---|---|---|
| 2013/0150007 | A1 | 6/2013 | Wang et al. |
| 2015/0085800 | A1 | 3/2015 | Sivanesan et al. |
| 2016/0234714 | A1 | 8/2016 | Basu Mallick et al. |
| 2017/0111911 | A1* | 4/2017 | Uchino ................. H04W 28/16 |
| 2017/0290064 | A1 | 10/2017 | Liu et al. |
| 2018/0227805 | A1 | 8/2018 | Jang et al. |
| 2018/0279173 | A1 | 9/2018 | Loehr et al. |
| 2018/0310202 | A1 | 10/2018 | Lohr et al. |
| 2018/0352556 | A1* | 12/2018 | Loehr ................ H04W 28/0205 |
| 2019/0069308 | A1* | 2/2019 | Lee ........................ H04W 72/10 |
| 2019/0166576 | A1 | 5/2019 | Kim et al. |
| 2019/0174395 | A1 | 6/2019 | Choe et al. |
| 2019/0261355 | A1 | 8/2019 | Lin |
| 2019/0297523 | A1* | 9/2019 | Basu Mallick ... H04W 72/0413 |
| 2019/0349822 | A1 | 11/2019 | Kim et al. |
| 2020/0068437 | A1 | 2/2020 | Lohr et al. |
| 2020/0107215 | A1* | 4/2020 | Lee .................... H04W 28/0252 |
| 2020/0205213 | A1* | 6/2020 | Marco ................... H04W 76/15 |

OTHER PUBLICATIONS

European Search Report dated Dec. 4, 2020 in connection with European Application No. 20184857.9, 10 pages.
European Search Report dated Dec. 14, 2020 in connection with European Application No. 20183917.2, 12 pages.
Ericsson, "UL Split in Dual Connectivity," Tdoc R2-1702749, 3GPP TSG-RAN WG2 #97bis, Spokane, USA, Apr. 3-7, 2017, 4 pages.
Ericsson, "PDCP Uplink transmit operation," Tdoc R2-1704681, 3GPP TSG-RAN WG2 #98, Hangzhou, P.R. China, May 15-19, 2017, 6 pages.
Ericsson (Rapporteur), "UL Split in Dual Connectivity," Tdoc R2-1704381, 3GPP TSG-RAN WG2 #98, Hangzhou, P.R. China, May 15-19, 2017, 11 pages.
LG Electronics Inc, "Threshold for UL split with preprocessing," R2-1711730 resubmission of R2-1709656, 3GPP TSG-RAN WG2 Meeting #99bis, Prague, Czech Republic, Oct. 9-13, 2017, 3 pages.
Sequans Communications, "Limited LL buffering for NR UL data split," R2-1708778, 3GPP TSG-RAN WG2 Meeting #99, Berlin, Germany, Aug. 21-25, 2017, 7 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.1.0 (Mar. 2020), 74 pages.
"3rd Generation Partnership Project; Technical Specification Group Radio Access Network; NR; Packet Data Convergence Protocol (PDCP) specification (Release 16)", 3GPP TS 38.323 V16.0.0 (Mar. 2020), 37 pages.
"3rd Generation Partnership Project; Technical Specification Group Radio Access Network; NR; Medium Access Control (MAC) protocol specification (Release 16)", 3GPP TS 38.321 V16.0.0 (Mar. 2020), 141 pages.
"3rd Generation Partnership Project; Technical Specification Group Radio Access Network; NR; Radio Resource Control (RRC) protocol specification (Release16)", 3GPP TS 38.331 V16.0.0 (Mar. 2020), 835 pages.
International Search Report and Written Opinion of the International Searching Authority in connection with International Application No. PCT/KR2020/006813 dated Aug. 28, 2020, 9 pages.
International Search Report and Written Opinion of the International Searching Authority in connection with International Application No. PCT/KR2020/006814 dated Aug. 28, 2020, 9 pages.
3GPP TS 37.340 V15.6.0 (Jun. 2019), Technical Specification, 3rd Generation Partnership Project; Technical Specification Group Radio Access Network; Evolved Universal Terrestrial Radio Access (E-UTRA) and NR; Multi-connectivity; Stage 2 (Release 15), Jun. 2019, 69 pages.
Aijaz, Adnan, "Packet Duplication in Dual Connectivity Enabled 5G Wireless Networks: Overview and Challenges," IEEE Communications Standards Magazine, arXiv:1804.01058v2 [cs.NI], May 29, 2019, 9 pages.
Intel Corporation, "Multi-connectivity support in IAB," R2-1906350, 3GPP TSG RAN WG2 Meeting #106, Reno, U.S.A., May 13-17, 2019, 9 pages.
Non-Final Office Action dated Sep. 30, 2021, in connection with U.S. Appl. No. 16/947,104, 25 pages.
Office Action dated Apr. 1, 2022 in connection with U.S. Appl. No. 16/947,104, 27 pages.

* cited by examiner

ELECTRONIC DEVICE FOR TRANSMITTING DATA THROUGH SPLIT BEARER AND METHOD OF OPERATING ELECTRONIC DEVICE

CROSS-REFERENCE TO RELATED APPLICATION

This application is based on and claims priority under 35 U.S.C. 119 to Korean Patent Application No. 10-2019-0086664 filed on Jul. 17, 2019 in the Korean Intellectual Property Office, the disclosure of which is herein incorporated by reference in its entirety.

BACKGROUND

1. Field

The disclosure relates to an electronic device and a method of operating the electronic device and, more particularly, to an electronic device for transmitting data through a split bearer and a method of operating the electronic device.

2. Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after $4^{th}$ Generation (4G) communication system commercialization, efforts to develop an improved $4^{th}$ Generation (5G) communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

The above information is presented as background information only to assist with an understanding of the disclosure. No determination has been made, and no assertion is made, as to whether any of the above might be applicable as prior art with regard to the disclosure.

SUMMARY

A recent communication scheme supporting $5^{th}$-generation communication may support a scheme (E-UTRA-NR dual connectivity (EN-DC)) using both $4^{th}$-generation communication and $5^{th}$-generation communication. The communication scheme supporting both $4^{th}$-generation communication and $5^{th}$-generation communication may use a base station (BS) supporting the $4^{th}$-generation communication as a master node and use a BS supporting the $5^{th}$-generation communication as a secondary node.

A portable terminal and a BS using an EN-DC scheme may transmit data through only a primary path or through both a data transmission path corresponding to $4^{th}$-generation communication and a data transmission path corresponding to $5^{th}$-generation communication according to the size of data to be transmitted. A data transmission path used for data transmission may be determined by the BS, and the portable terminal may use the transmission path determined by the BS.

However, the data transmission path determined by the BS may not accurately reflect the state of the portable terminal.

When the BS transmits a signal indicating the use (split bearer) of both the data transmission path corresponding to $4^{th}$-generation communication and the data transmission path corresponding to $5^{th}$-generation communication, the portable terminal may use all of the two data transmission paths to transmit data that can be transmitted through one of the two data transmission paths. This may cause an unnecessary increase in power consumption of the portable terminal.

Further, when the portable terminal transmits data through all of a plurality of paths, the portable terminal may split and transmit data without consideration of different data processing rates of respective transmission paths, and a receiving side may receive some data later. This may cause a decrease in a data processing rate of the receiving side.

In accordance with an aspect of the disclosure, an electronic device is provided. The electronic device includes: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first RLC configured to split data received from the PDCP and transmit the split data to a first MAC corresponding to the first cellular communication; and a second RLC configured to split data received from the PDCP and transmit the split data to a second MAC corresponding to the second cellular communication, wherein the PDCP is configured to receive data to be transmitted through the first cellular communication and/or the second cellular communication from the application processor, transmit the data to at least one of the first RLC or the second RLC, and stop transmitting the data to the RLC receiving the data, based on a result of comparison between the size of data temporarily stored in the RLC receiving the data with a first configuration value.

In accordance with another aspect of the disclosure, an electronic device is provided. The electronic device includes: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first RLC configured to split data received from the PDCP and transmit the split data to a first MAC corresponding to the first cellular communication; and a second RLC configured to split data received from the PDCP and transmit the split data to a second MAC corresponding to the second cellular communication, wherein the PDCP is configured to identify the size of data temporarily stored in the PDCP, the first RLC, and the second RLC, and operate in one operation mode among a first operation mode in which the data temporarily stored in the PDCP is transmitted to the first RLC and the second RLC so that no data is stored in the PDCP and a second operation mode in which the data temporarily stored in the PDCP is not transmitted so that the size of the data temporarily stored in the first RLC or the second RLC is not larger than a second configuration value, based on a result of comparison between the identified size of the data and a first configuration value.

In accordance with another aspect of the disclosure, a method of operating an electronic device is provided. The method includes: receiving data to be transmitted to one or more of a first node for performing first cellular communication with the electronic device and a second node for performing second cellular communication with the electronic device from an application processor, by a communication processor; transmitting the data to at least one of a first RLC or a second RLC; and stopping transmitting the data to the RLC receiving the data, based on a result of comparison between the size of data temporarily stored in the RLC receiving the data with a first configuration value while the data is transmitted.

In accordance with another aspect of the disclosure, an electronic device is provided. The electronic device includes: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first radio layer control (RLC) configured to split data received from the PDCP and transmit the split data to a first media access control (MAC) corresponding to the first cellular communication; and a second RLC configured to split data received from the PDCP and transmit the split data to a second MAC corresponding to the second cellular communication, wherein the PDCP is configured split data received from the application processor into data units having a preset size, identify a data processing rate of the first RLC and a data processing rate of the second RLC, and distribute the data units to the first RLC and the second RLC, based on the data processing rate of the first RLC and the data processing rate of the second RLC.

In accordance with another aspect of the disclosure, a method of operating an electronic device is provided. The method includes: receiving data to be transmitted to one or more of a first node for performing first cellular communication with the electronic device or a second node for performing second cellular communication with the electronic device from an application processor, by a communication processor; splitting the data into data units having a preset size, by a packet data convergence protocol (PDCP) implemented in the communication processor; identifying a data processing rate of a first radio layer control (RLC) configured to split data received from the PDCP and transmit the split data to a first media access control (MAC) corresponding to the first cellular communication and identifying a data processing rate of a second RLC configured to split the data received from the PDCP and transmit the split data to a second MAC corresponding to the second cellular communication; and distributing data units to the first RLC and the second RLC, based on the data processing rate of the first RLC and the data processing rate of the second RLC.

An electronic device and a method of operating the electronic device according to various embodiments may distribute data to a first radio layer control (RLC) and a second RLC on the basis of a data processing rate of the first RLC, a data processing rate of the second RLC, and uplink (UL) grant information of first cellular communication. Accordingly, the electronic device and the method of operating the electronic device according to various embodiments can reduce data received by a receiving side later.

The electronic device and the method of operating the electronic device according to various embodiments can control a transmission rate of data transmitted from a packet data convergence protocol (PDCP) to an RLC in consideration of the size of data existing in the RLC and the transmission rate of the data. Accordingly, the electronic device and the method of operating the electronic device according to various embodiments can reduce data received by a receiving side later.

The electronic device and the method of operating the electronic device according to various embodiments can reduce data received by the receiving side later, thereby preventing activation of a timer which may be generated by the receiving side and increasing a data processing rate.

The electronic device and the method of operating the electronic device according to various embodiments can support data transmission using only a primary path for data transmission through a split bearer in consideration of a data transmission rate. Accordingly, it is possible to prevent data transmission using the other path and reduce unnecessary power consumption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
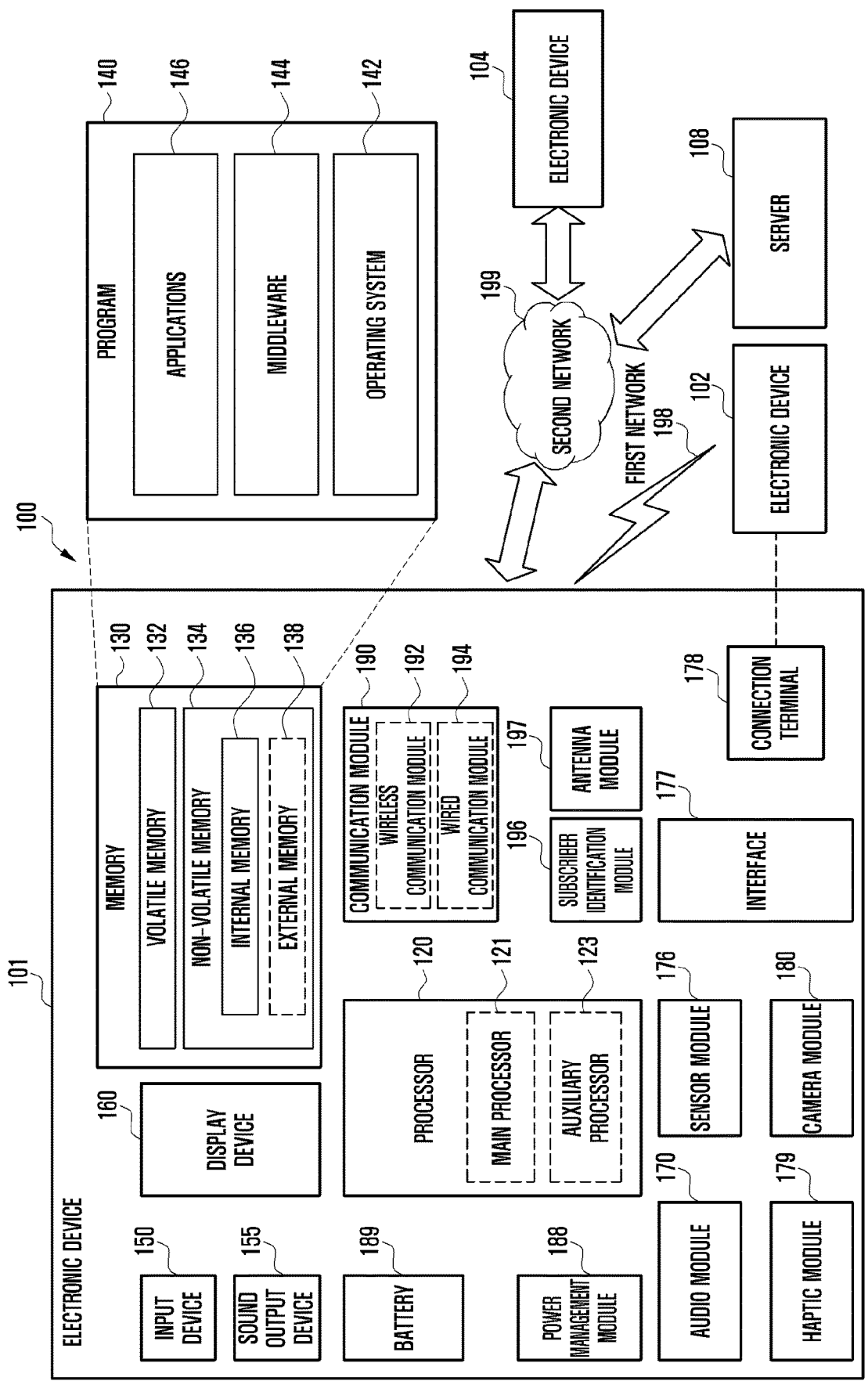
FIG. 1 illustrates a block diagram of an electronic device according to various embodiments.

FIG. 1 illustrates a block diagram of an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
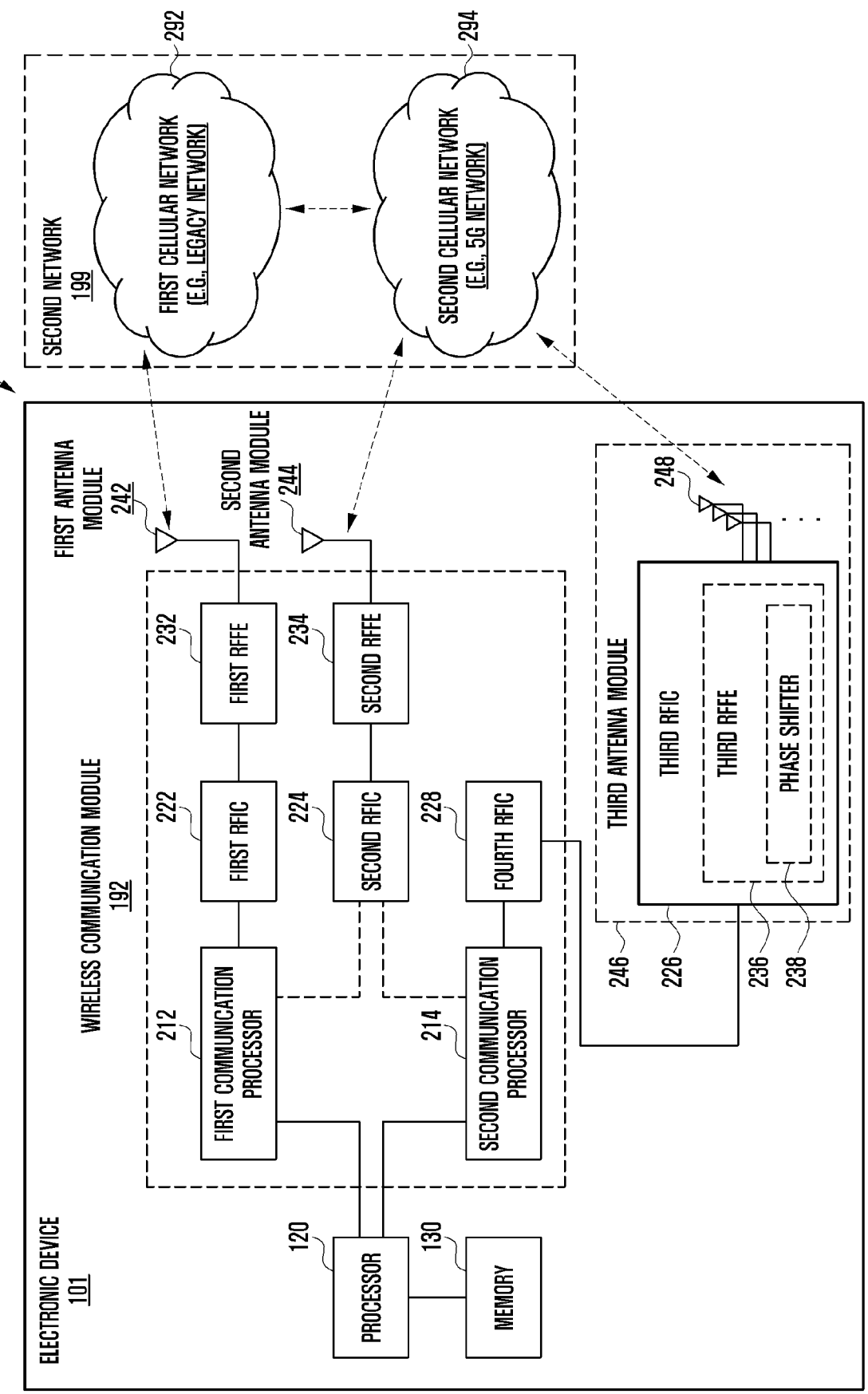
FIG. 2 illustrates a block diagram of an electronic device for supporting legacy network communication and 5G network communication according to various embodiments.

FIG. 2 illustrates a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
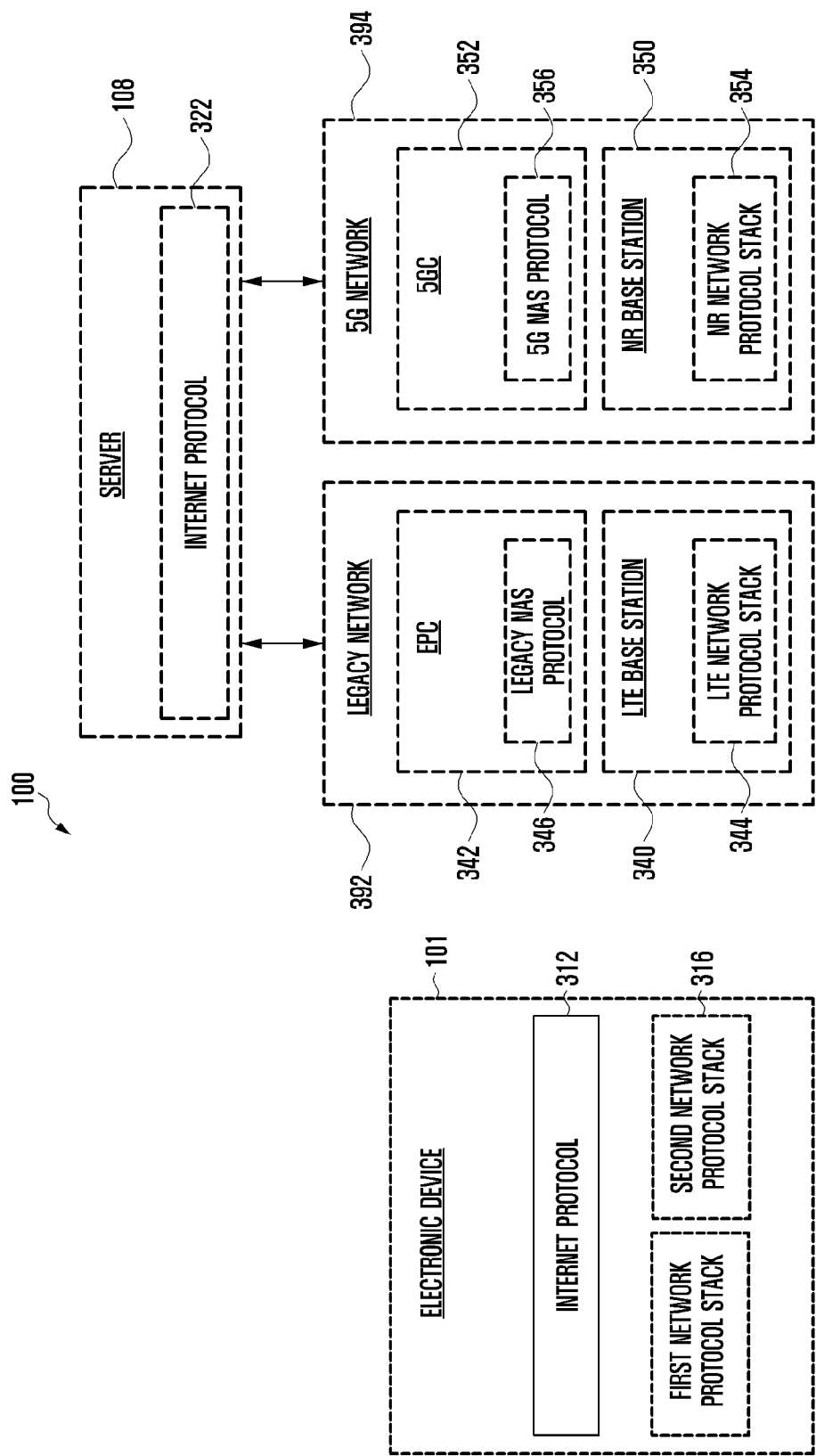
FIG. 3 illustrates a protocol stack structure of a network 100 of legacy communication and/or 5G communication according to an embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
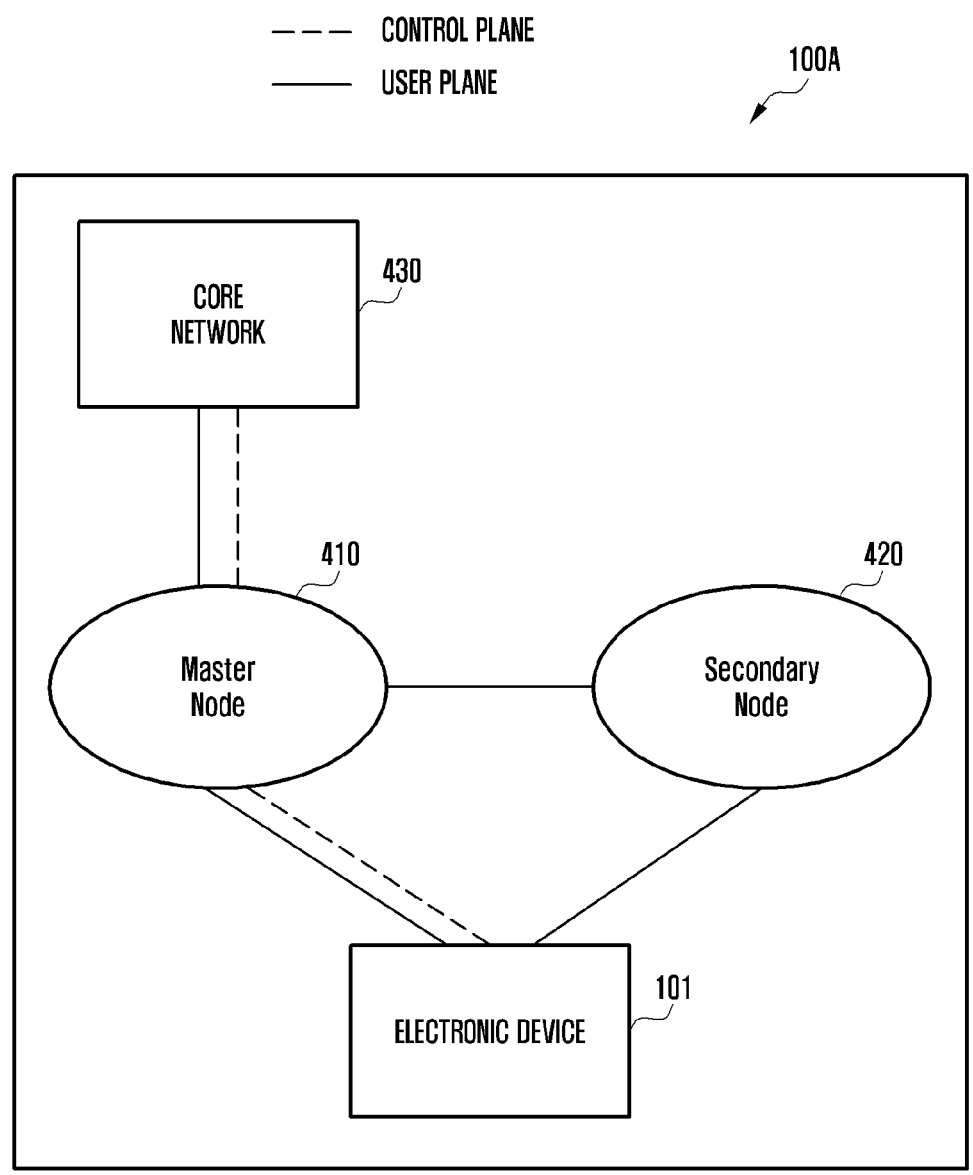
FIG. 4A illustrates a wireless communication system providing a network of legacy communication and/or 5G communication according to various embodiments.
Figure 4B:
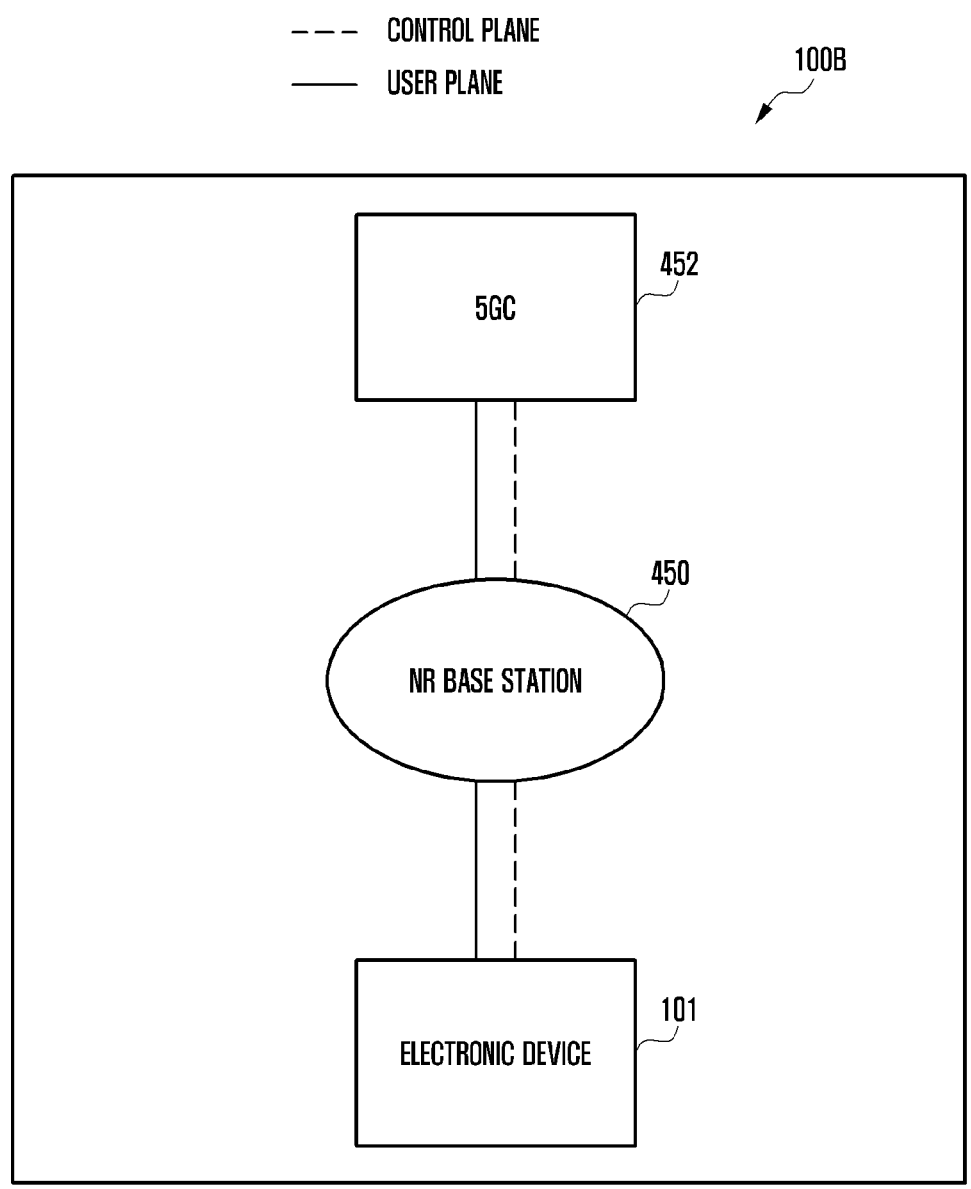
FIG. 4B illustrates a wireless communication system providing a network of legacy communication and/or 5G communication according to various embodiments.
Figure 4C:
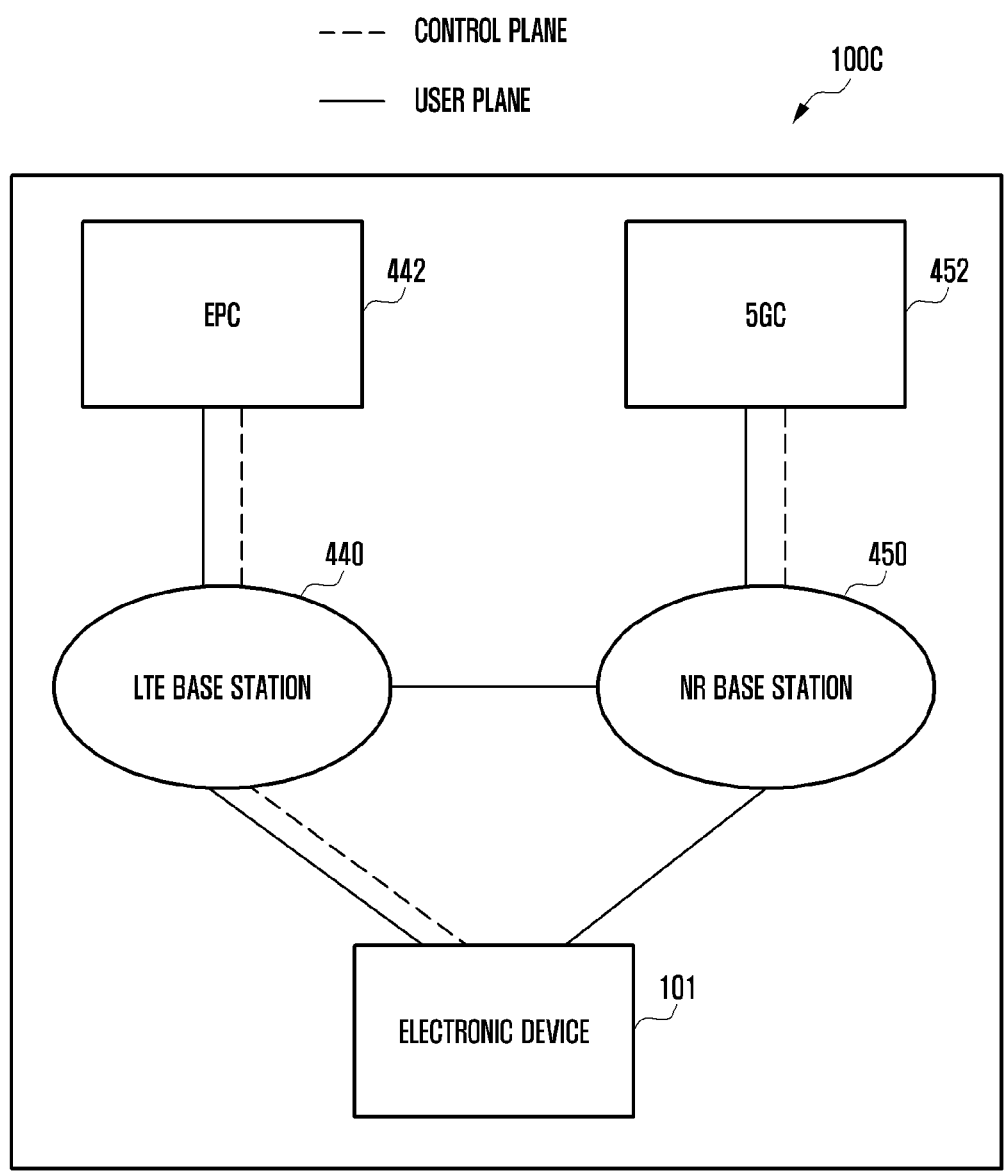
FIG. 4C illustrates a wireless communication system providing a network of legacy communication and/or 5G communication according to various embodiments.

FIG. 4A illustrates a wireless communication system providing a network of legacy communication and/or 5G communication according to certain embodiments, FIG. 4B illustrates a wireless communication system providing a network of legacy communication and/or 5G communication according to certain embodiments, and FIG. 4C illustrates a wireless communication system providing a network of legacy communication and/or 5G communication according to certain embodiments. Referring to FIGS. 4A to 4C, network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a $5^{th}$ generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
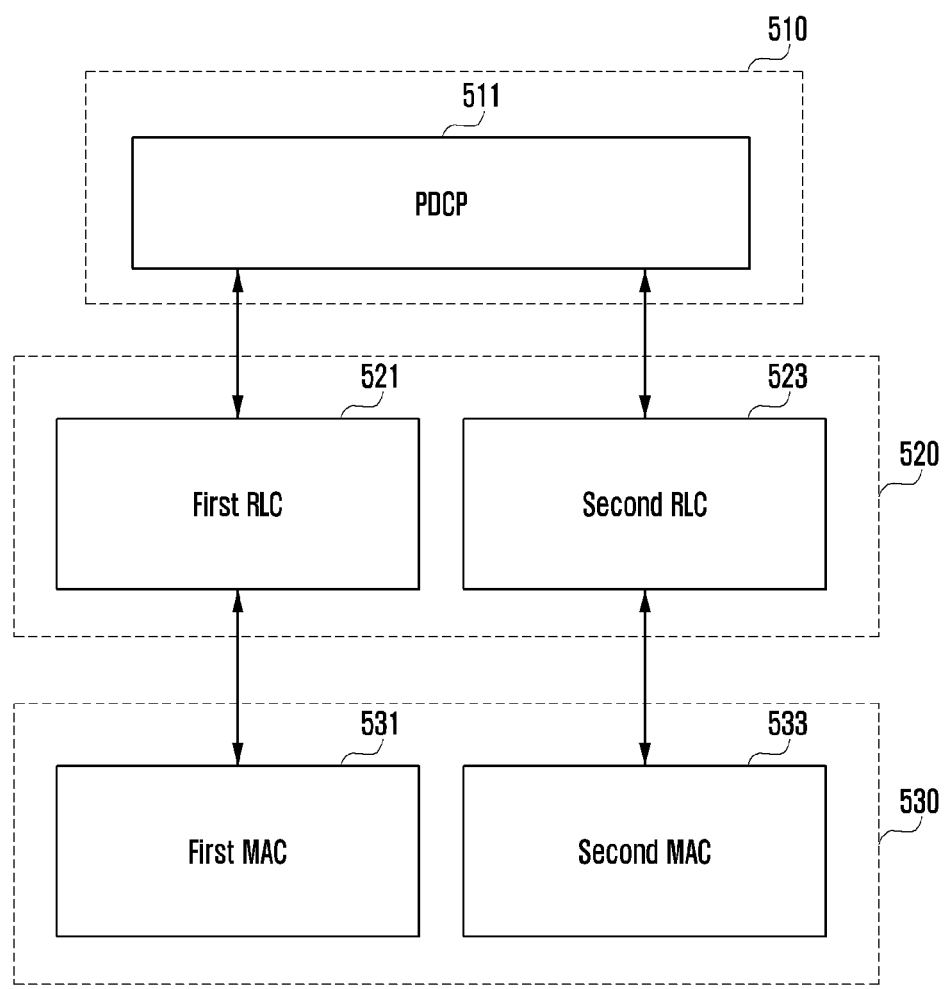
FIG. 5 illustrates a block diagram of a wireless communication module of an electronic device according to various embodiments.

FIG. 5 illustrates a block diagram of a wireless communication module of an electronic device according to various embodiments.

A wireless communication module (for example, the wireless communication module 192 of FIG. 1) of an electronic device (for example, the electronic device 101 of FIG. 1) according to various embodiments may include a plurality of software layers for data communication. For example, a communication processor (for example, the first communication processor 212 or the second communication processor 214 of FIG. 2) included in the wireless communication module 192 may execute and provide a plurality of software layers. The plurality of software layers may include one or more entities. Referring to FIG. 5, the wireless communication module 192 may include a packet data convergence protocol (PDCP) layer 510, a radio layer control (RLC) layer 520, and a media access control (MAC) layer 530.

According to various embodiments, the PDCP layer 510 may include a PDCP entity 511 for performing an operation of receiving data transmitted from the RLC layer 520 and aggregating the received data. In an aspect of receiving data by the wireless communication module 192 (in a downlink), the PDCP entity 511 may identify a sequence number of each of the received data and aggregate the received data on the basis of the sequence number. The PDCP entity 511 may perform various processing operations (for example, integrity verification of the received data) on the received data and transmit the processed data to various layers (for example, an IP layer) higher than another layer (for example, the PDCP layer 510). In an aspect of transmitting data by the wireless communication module 192 (in an uplink), the PDCP entity 511 may generate data units by splitting data to be transmitted into data units having a predetermined size. The PDCP entity 511 may assign a sequence number to each of the data units. The PDCP entity 511 may transmit the generated data units to the RLC layer 520.

According to various embodiments, the RLC layer 520 may include RLC entities (for example, a first RLC 521 or a second RLC 523) for performing various operations of data transmitted from the PDCP layer 510 or data transmitted from the MAC layer 530. In an aspect of receiving data by the wireless communication module 192 (in the downlink), the RLC entities 521 and 523 may identify sequence numbers of data transmitted from the MAC layer 530 and process the data (for example, concatenate, split, or reassemble the data) to transmit the same to the PDCP layer 510. In an aspect of transmitting data by the wireless communication module 192 (in the uplink), the RLC entities 521 and 523 may identify sequence numbers of data transmitted from the PDCP layer 510 and concatenate, split, or reassemble the data to have the size which can be received by the MAC layer 530.

According to various embodiments, the PDCP entity 511, the first RLC 521, or the second RLC 523 may temporarily store data in a predetermined area of a memory (for example, the memory 130 of FIG. 1 or a memory within the communication module 190).

According to various embodiments, the MAC layer 530 may include MAC entities (for example, a first MAC 531 or a second MAC 533) for performing various operations of data transmitted from the RLC layer 520 or data received from a physical (PHY) layer that transmits or receives data through a radio channel. In an aspect of receiving data by the wireless communication module 192 (in the downlink), the wireless communication module 192 may process data received from the physical layer to transmit the same to the RLC layer 520. In an aspect of transmitting data by the wireless communication module 192, the MAC entities 531 and 533 may perform an operation of selecting an appropriate transmission channel to transmit data received from the RLC layer 520 and adding required control information to the data received from the RLC layer 520. The MAC entities 531 and 533 may generate a block status report (BSR) related to the size of data temporarily stored in the PDCP layer 510 and the RLC layer 520 and transmit the BSR to the BS.

The wireless communication module 192 of the electronic device 101 according to various embodiments may perform first cellular communication with a first node (for example, the master node 410 of FIG. 4A). The first communication processor 520 may transmit or receive a control message and data to and from the first node 410 while performing the first cellular communication. The first cellular communication may be one of various cellular communication schemes supported by the electronic device 101. For example, the first cellular communication may be one of $4^{th}$-generation mobile communication schemes (for example, long-term evolution (LTE), LTE-advanced (LTE-A), and LTE-advanced pro (LTE-A pro)) and may correspond to, for example, a communication scheme in the first cellular network of FIG. 2. The first node 410 may be a base station supporting first cellular communication.

The wireless communication module 192 of the electronic device 101 according to various embodiments may perform second cellular communication with a second node (for example, the secondary node 420 of FIG. 4A). The second communication processor 530 may transmit or receive data to or from the second node 420 while performing second cellular communication. The second cellular communication may be one of various cellular communication schemes supported by the electronic device 101 and may correspond to a communication scheme on the second cellular network 294 of FIG. 2. For example, the second cellular communication may be one of $5^{th}$-generation mobile communication schemes (for example, 5G). The second node 420 may be a base station supporting second cellular communication.

According to various embodiments, an E-UTRA-NR dual connectivity (EN-DC) environment in which the first cellular communication is a $4^{th}$ generation mobile communication scheme and the second cellular communication is a $5^{th}$ generation mobile communication scheme is mainly described, but the disclosure is not limited thereto. For example, various embodiments may be applied to an NR-E-UTRA dual connectivity (NE-DC) environment in which the first cellular communication is a $5^{th}$ generation mobile communication scheme and the second cellular communication is a $4^{th}$ generation mobile communication scheme and an environment in which both the first cellular communication scheme and the second cellular communication scheme are a $5^{th}$ generation mobile communication scheme but they support different frequency bands.

According to various embodiments, the wireless communication module 192 may support (uplink) EN-DC for transmitting data through one or more of first cellular communication and second cellular communication. The wireless communication module 192 may include the first RLC 521 and the first MAC 531 for supporting first cellular communication implemented in the EN-DC scheme. The wireless communication module 192 may include the second RLC 523 and the second MAC 533 for supporting second cellular communication implemented in the EN-DC scheme. The PDCP entity 511 may transmit at least some of the generated data units to the first node 410 through first cellular communication and transmit some of the generated data units to the second node 420 through second cellular communication. The PDCP entity 511 may transmit the data units, transmitted to the first node 410, to the first RLC 521, and the first RLC 521 may transmit the received data units to the first MAC 531. The PDCP entity 511 may transmit the data units, transmitted to the second node 420, to the second RLC 523, and the second RLC 523 may transmit the received data units to the second MAC 533. A path for transmitting data through all of the two paths (the path through which the PDCP entity 511 performs transmission to the first MAC 531 via the first RLC 521 and the path through which the PDCP entity 511 performs transmission to the second MAC 533 via the second RLC 523) may be defined as a split bearer. The path through which data is transmitted to a main node (for example, the first node 410) among the two paths may be defined as a master cell group bearer (MCG bearer). The path through which data is transmitted to a secondary node (for example, the second node 420) among the two paths may be defined as a secondary cell group bearer (SCG bearer).

Figure 6:
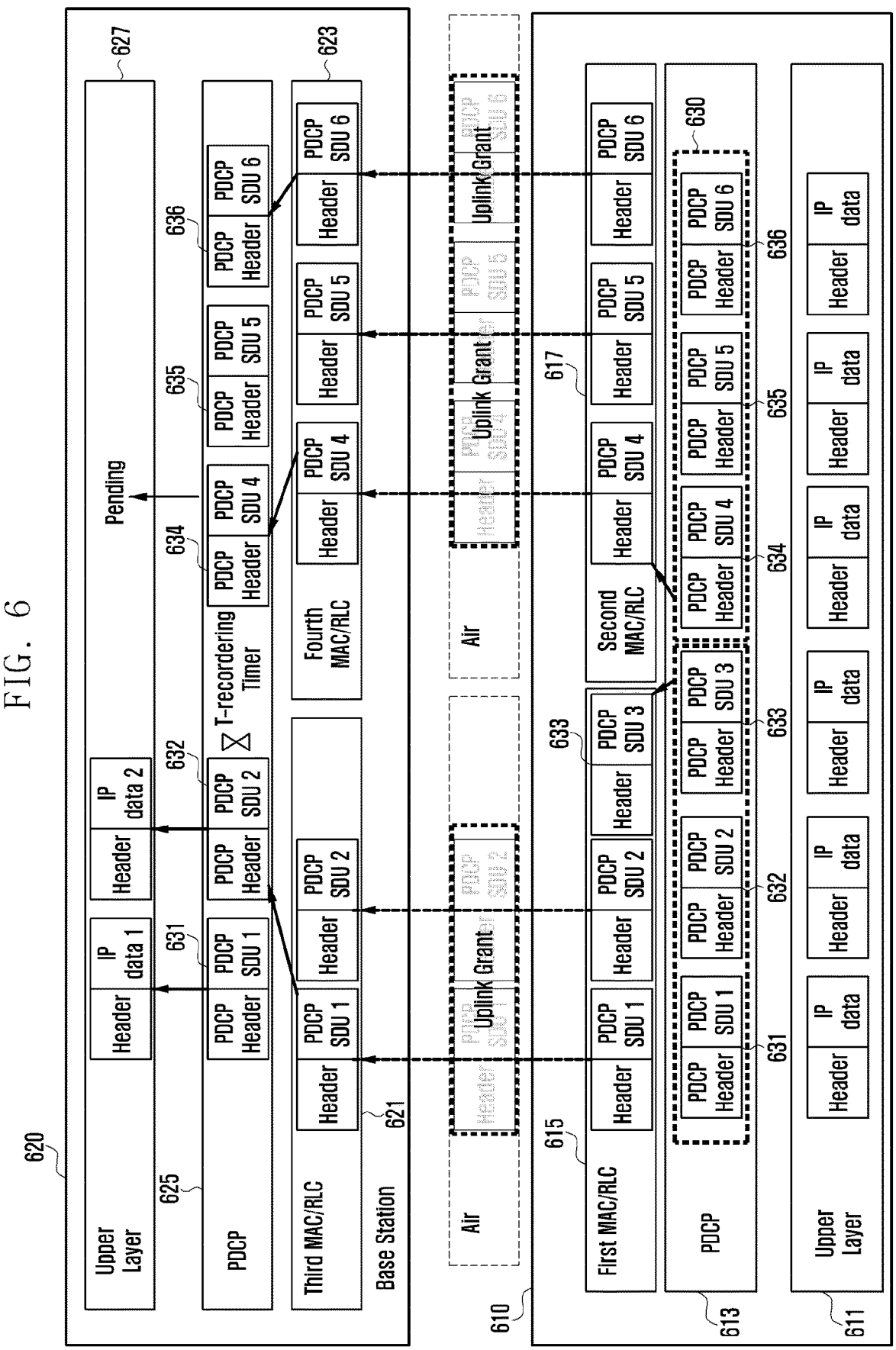
FIG. 6 illustrates data transmission using a split bearer by an electronic device according to various embodiments.

FIG. 6 illustrates data transmission using a split bearer by an electronic device according to various embodiments.

FIG. 6 illustrates an embodiment in which an electronic device 610 (for example, the electronic device 101 of FIG. 1) transmits data to a BS 620.

According to various embodiments, a higher layer 611 (for example, an IP layer) of the electronic device 610 may transmit data, to be transmitted to the second node 420, to a PDCP 611 (for example, the PDCP entity 511 of FIG. 5). The PDCP 611 may generate data units 631, 632, 633, 634, 635, and 636 by splitting received data 630. Sizes of the split data units 631, 632, 633, 634, 635, and 636 may be the same as each other.

According to various embodiments, the PDCP 611 may determine whether to use a split bearer on the basis of the size of data to be transmitted. The PDCP 611 may compare an uplink data split threshold value (ul-DataSplitThreshold) received from the first node 410 or the second node 420 with the size of data and determine whether to transmit the data through a primary path and a secondary path on the basis of the comparison result. A detailed embodiment for determining whether to transmit the data through the primary path and the secondary path will be described below with reference to FIGS. 9 to 13.

According to various embodiments, the PDCP 611 may transmit at least some 631, 632, and 633 of the data units 631, 632, 633, 634, 635, and 636 to a first RLC (for example, the first RLC 521 of FIG. 5). The first RLC 521 may perform various processings such as concatenating and splitting the received data to transmit the processed data units 631, 632, and 633 to the first MAC 531. The first MAC 531 may transmit the processed data units 631, 632, and 633 to the first node 410 through first cellular communication on the basis of uplink grant information. The first node 410 may transmit again the received data units 631, 632, and 633 to a node (for example, the second node 420) implemented by the PDCP 625.

FIG. 6 illustrates the first MAC 531 and the first RLC 521 as a first MAC/RLC 615 which is one element for convenience of description, and the first MAC 531 and the first RLC 521 may be implemented as one element according to an embodiment. FIG. 6 illustrates that a BS 620 to which an electronic device 610 transmits data is one node, which is implemented as one physical node. According to various embodiments, a third MAC/RCL 621 may be implemented on the first node 410, and a fourth MAC/RLC 623 and the PDCP 625 may be implemented on the second node 420. According to another embodiment, the third MAC/RLC 621 and the PDCP 625 may be implemented on the first node 410, and a fourth MAC/RLC 623 may be implemented on the second node 420. When data is transmitted between layers included in the electronic device 610 and the BS 620, a header included in the data may be changed.

According to various embodiments, the PDCP 611 may transmit at least some 634, 635, and 636 of the data units 631, 632, 633, 634, 635, and 636 to a second RLC (for example, the second RLC 523 of FIG. 5). The second RLC 523 may process the received data units 634, 635, and 636 and transmit the processed data units 634, 635, and 636 to the second MAC 533. The second MAC 533 may transmit the processed data units 634, 635, and 636 to the BS 620 through second cellular communication on the basis of uplink grant information of the second cellular communication. FIG. 6 illustrates the second MAC 533 and the second RLC 523 as a second MAC/RLC 615 which is one element for convenience of description, and the second MAC 533 and the second RLC 523 may be implemented as more than one element according to an embodiment.

According to various embodiments, the third MAC/RLC 621 of the BS 620 may receive at least some 631 and 632 of the data units 631, 632, and 633 transmitted by the first MAC/RLC 615. The third MAC/RLC 621 may transmit the received data units 631 and 632 to the PDCP 625.

According to various embodiments, the fourth MAC/RLC 623 of the BS 620 may receive at least some 634, 635, and 636 of the data units 634, 635, and 636 transmitted by the second MAC/RLC 617. The fourth MAC/RLC 623 may transmit the received data units 634, 635, and 636 to the PDCP 625.

According to various embodiments, the PDCP 625 may aggregate the received data units and generate data obtained by aggregating the data units. The PDCP 625 may transmit the generated data to a higher layer 627. The data transmitted to the higher layer 627 may be data that is the same as or similar to data transmitted by the higher layer 611 of the electronic device 610.

According to various embodiments, the PDCP 625 may identify whether the received data units 631, 632, 634, 635, and 636 are one complete data and aggregate the received data units on the basis of the identification result. The PDCP 625 may identify sequence numbers of the received data units 631, 632, 634, 635, and 636 and identify that the sequence numbers are not consecutive. The non-consecutive sequence numbers may mean that one data unit 633 has not yet been received. The PDCP 625 may identify that all of the data units have not yet been received and stand by until a preset timer (t-reordering timer) expires without the operation for aggregating the data units. The timer may be activated when some data units 633 are not transmitted. After the timer expires, at least some of the received data units 631, 632, 634, 635, and 636 may be transmitted to a higher layer 627 (for example, an IP layer). The data units 634, 635, and 636 having sequence numbers larger than the data unit 633, which is not received, among the received data units 631, 632, 634, 635, and 636 may not be transmitted to the higher layer 627.

According to various embodiments, when the preset timer expires, the PDCP 625 may aggregate the received data units and transmit the aggregated data units to the higher layer 627. When the remaining data units 633 are received before the preset timer expires, the PDCP 625 may aggregate the data units regardless of expiration of the timer, and transmit the aggregated data units to the higher layer 627.

Figure 8:
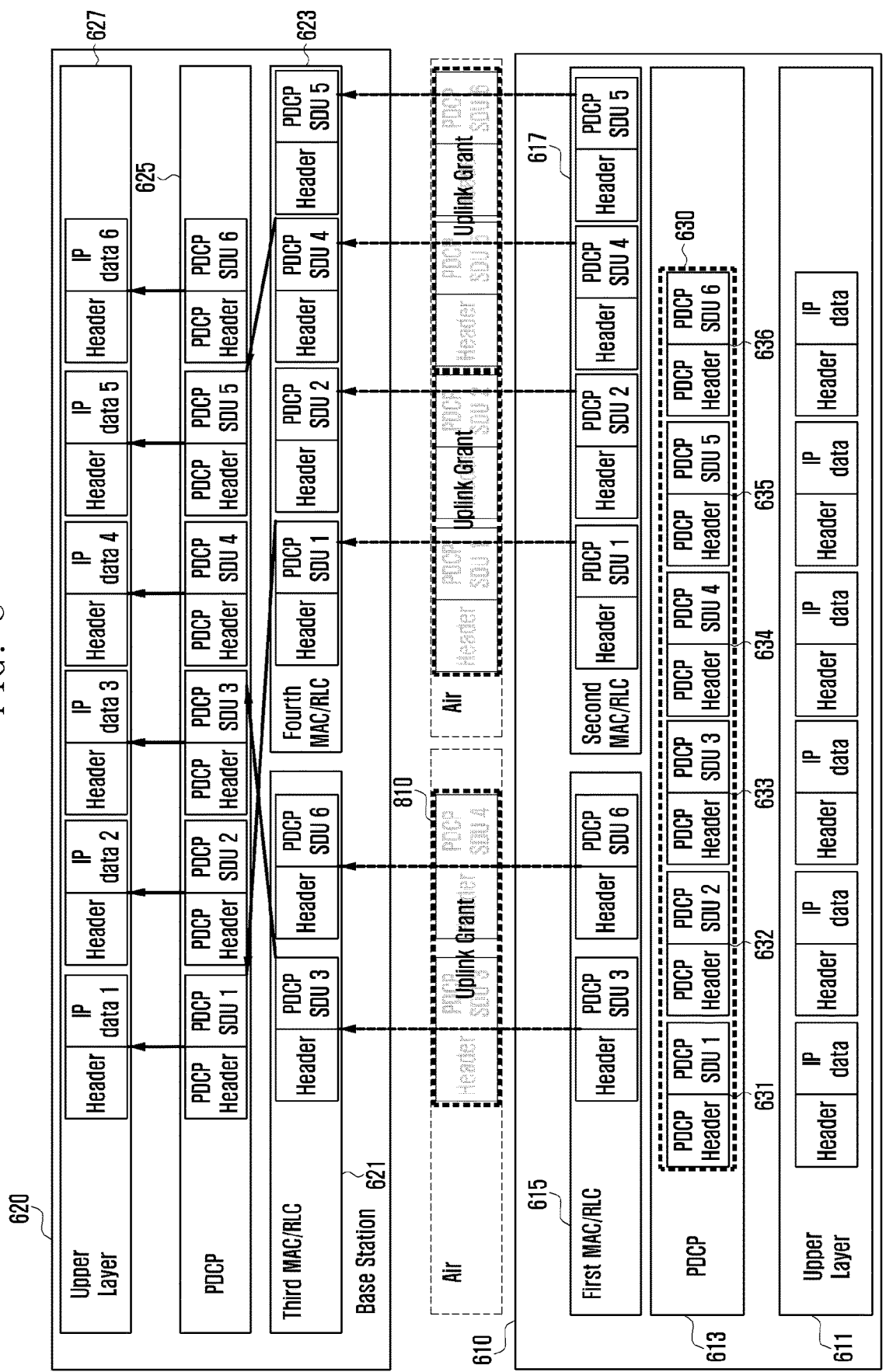
FIG. 8 illustrates an embodiment in which the electronic device according to various embodiments distributes data and designates sequences thereof on the basis of data processing rates of a first RLC and a second RLC.
Figure 9:
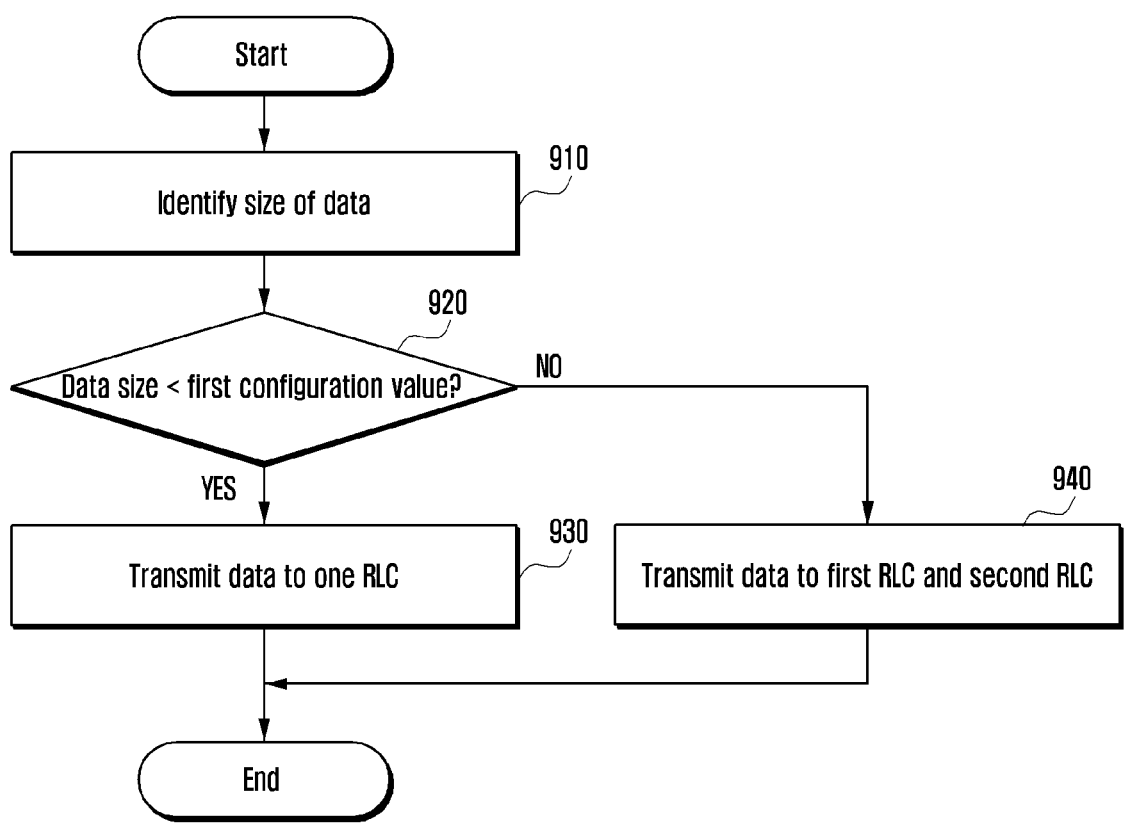
FIG. 9 illustrates a flowchart of an operation of a first mode in which the electronic device according to various embodiments selects a data transmission path on the basis of the size of data to be transmitted and the size of successfully transmitted data per unit time.

According to a comparative example, when packets (for example, the data unit 633) are not received or are received late due to deterioration of a communication state (for example, deteriorate of a data transmission rate of first cellular communication), the preset timer may be activated, and the PDCP 625 may stand by without aggregating data while the preset timer is activated. As the PDCP 625 stands by without aggregating data, a data processing rate (throughput) of the PDCP 625 may be reduced. Reduction in the data processing rate of the PDCP 625 may cause a phenomenon of reducing a data processing rate of the higher layer 627 and an application processor (for example, the processor 120 of FIG. 1) for processing data. Hereinafter, FIG. 7A illustrates various technologies for preventing the phenomenon, FIG. 7B illustrates various technologies for preventing the phenomenon, FIG. 7C illustrates various technologies for preventing the phenomenon, FIG. 7D illustrates various technologies for preventing the phenomenon, FIG. 7E illustrates various technologies for preventing the phenomenon, FIG. 7F illustrates various technologies for preventing the phenomenon, FIG. 8 illustrates various technologies for preventing the phenomenon, and FIG. 9 illustrates various technologies for preventing the phenomenon.

Figure 7A:
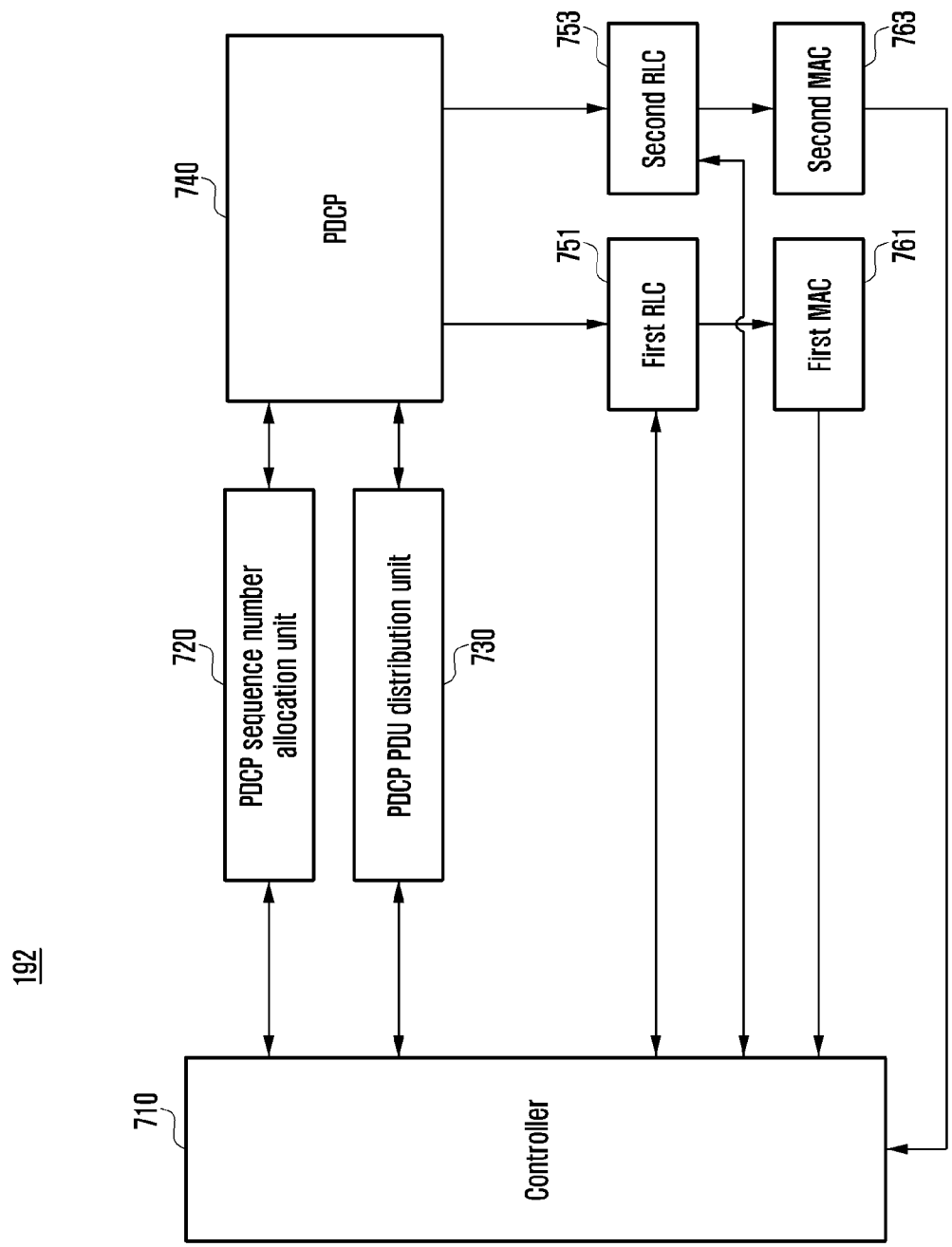
FIG. 7A illustrates a block diagram of a wireless communication module of an electronic device according to various embodiments.
Figure 7B:
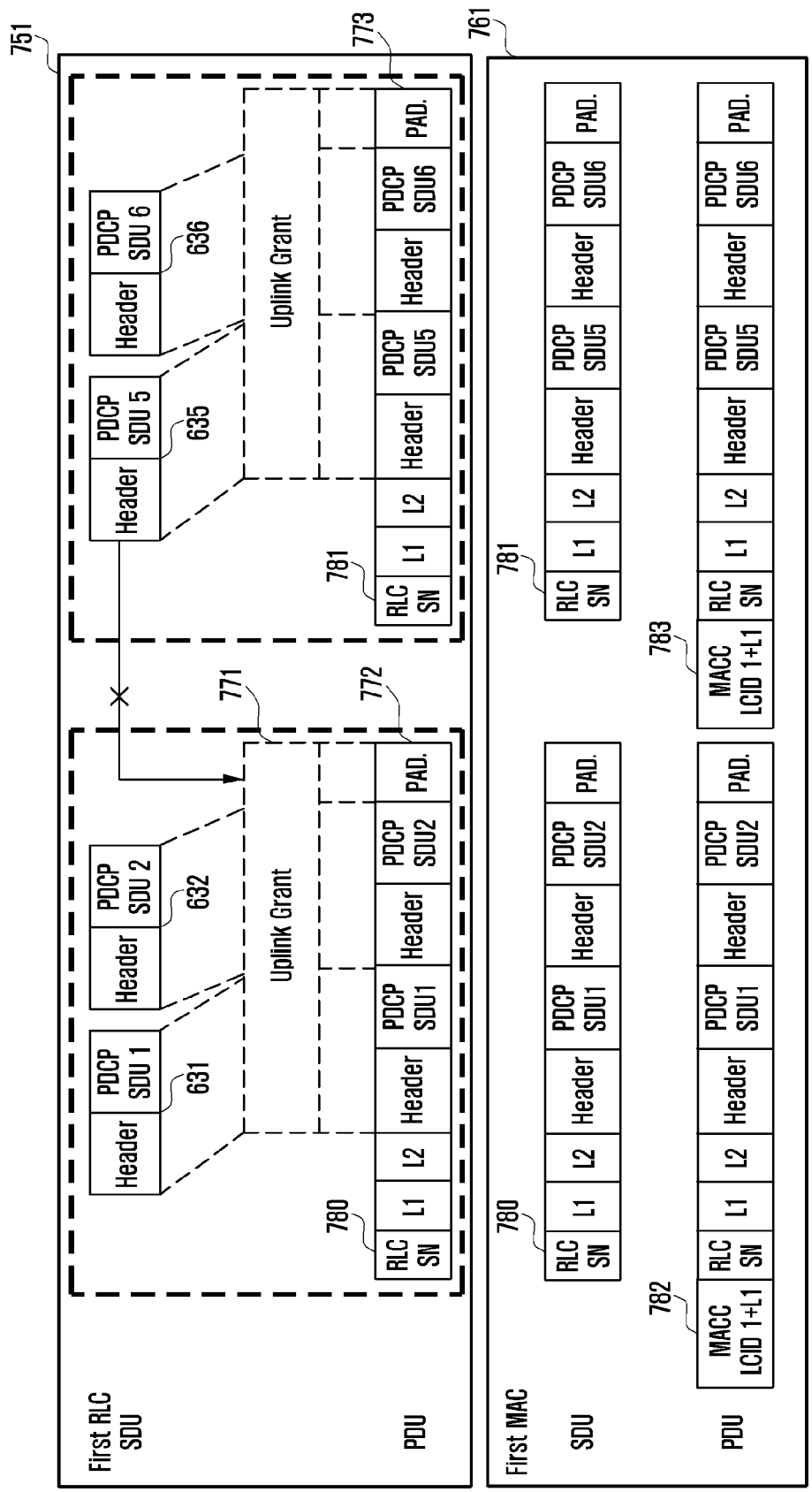
FIG. 7B illustrates an embodiment in which a first RLC (for example, the first RLC 751 of FIG. 7A) of the electronic device according to various embodiments processes data units.
Figure 7C:
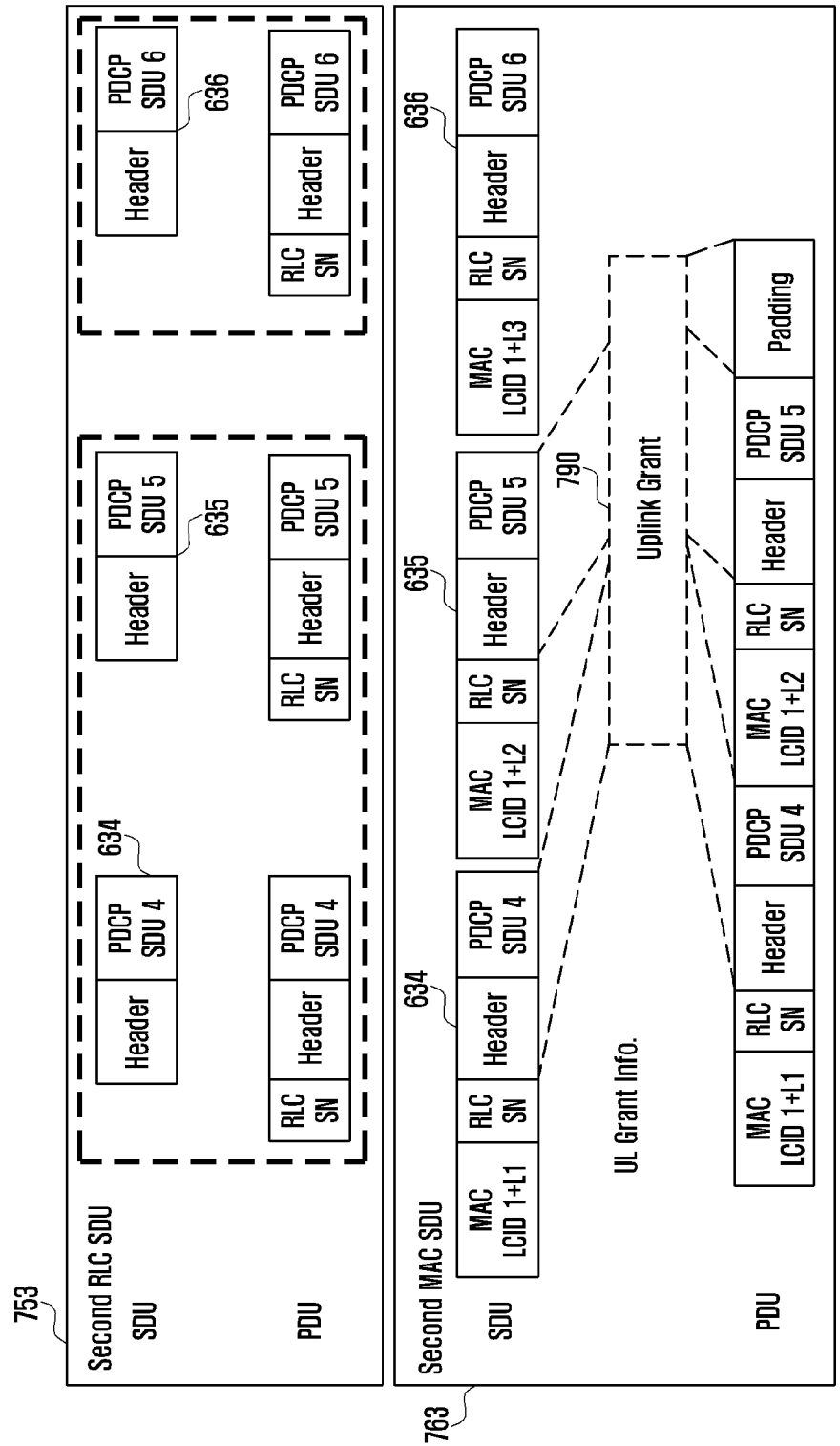
FIG. 7C illustrates an embodiment in which a second RLC (for example, the second RLC 753 of FIG. 7A) of the electronic device according to various embodiments processes data units.
Figure 7D:
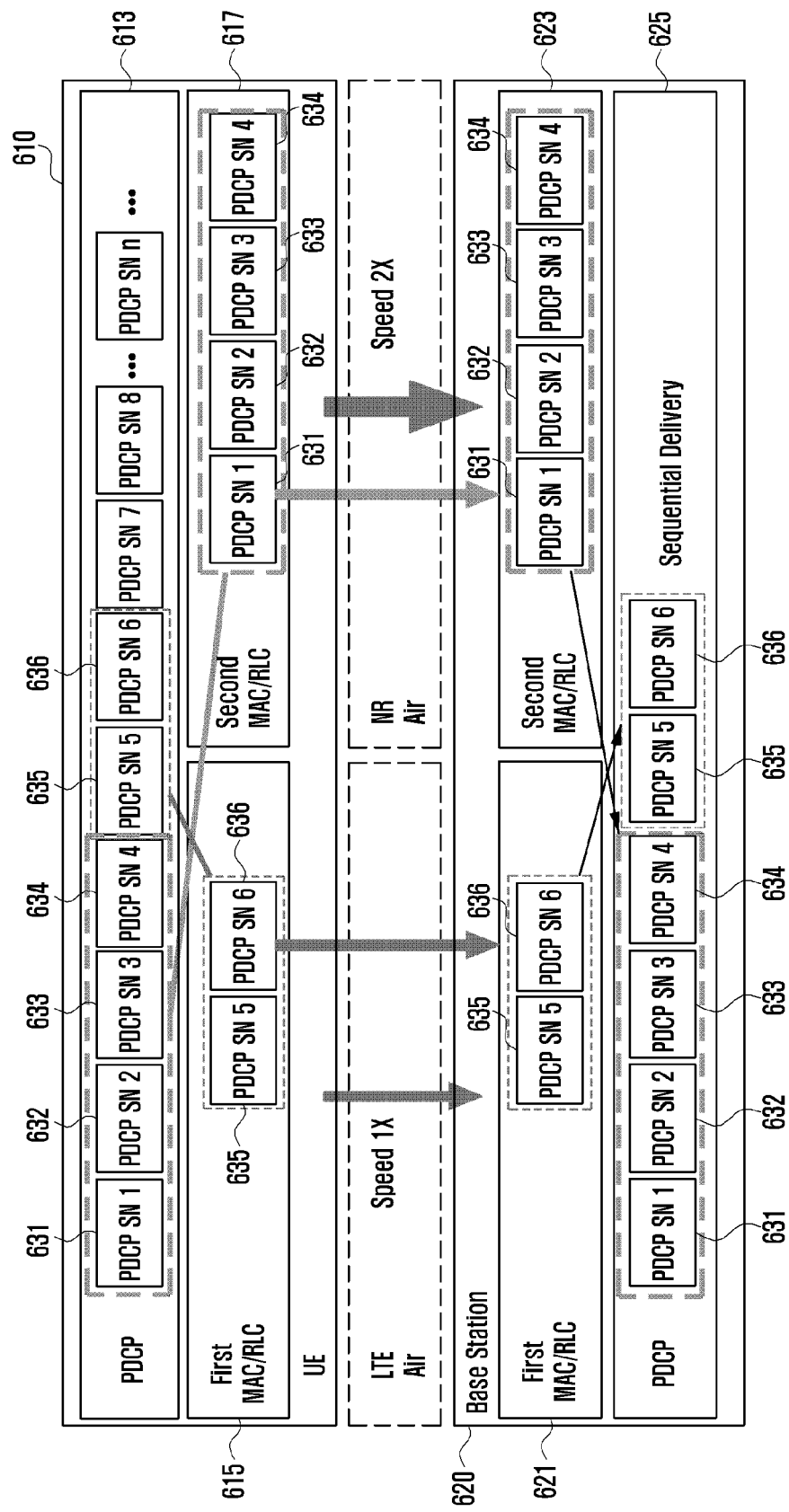
FIG. 7D illustrates an embodiment in which a PDCP sequence number allocation unit (for example, the PDCP sequence number allocation unit 720 of FIG. 7A) of the electronic device according to various embodiments assigns sequence numbers of data units.
Figure 7E:
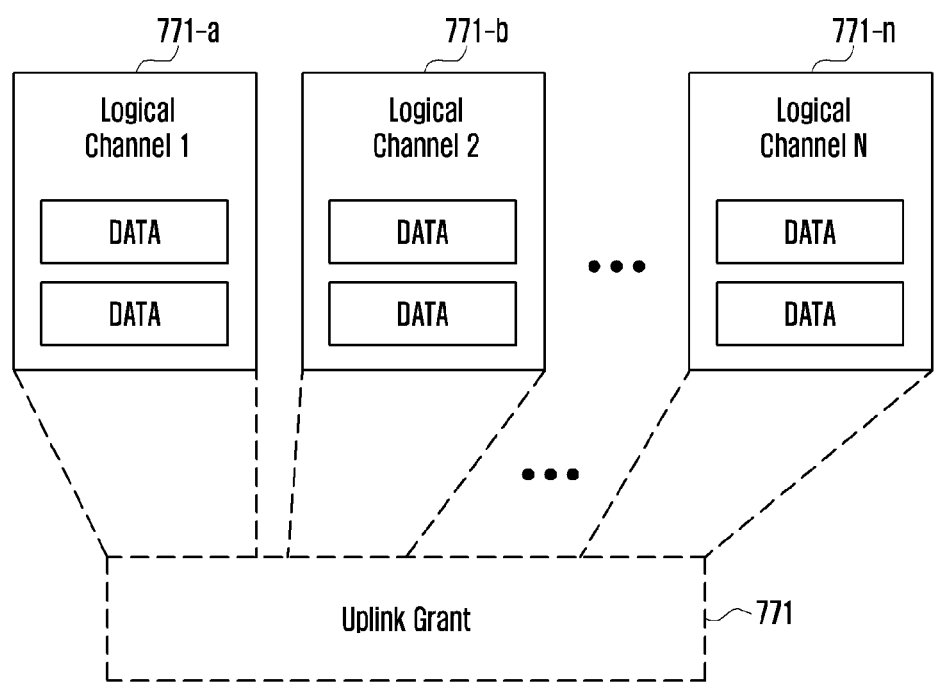
FIG. 7E illustrates the case in which the electronic device according to various embodiments implements a plurality of logical channels in uplink resources used for data transmission.
Figure 7F:
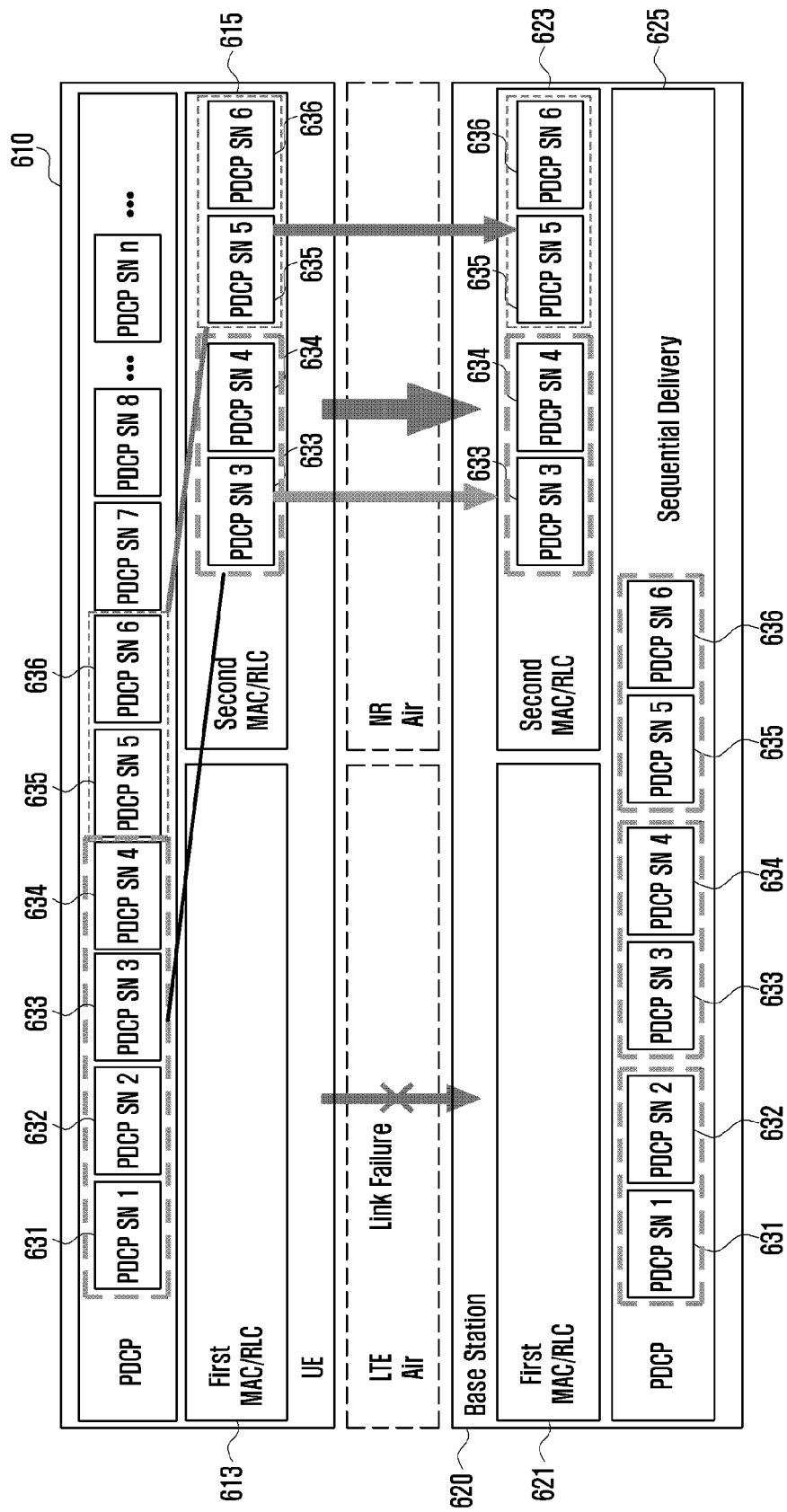
FIG. 7F illustrates an embodiment in which the electronic device according to various embodiments transmits data through only one path because the other one of two transmission paths has a problem.

FIG. 7A illustrates a block diagram of a wireless communication module of an electronic device according to various embodiments.

Referring to FIG. 7A, a wireless communication module (for example, the wireless communication module 192 of FIG. 1) of an electronic device (for example, the electronic device 101 of FIG. 1) according to various embodiments may include a controller 710, a PDCP sequence number allocation unit 720, a PDCP PDU distribution unit 730, a PDCP 740 (for example, the PDCP entity 511 of FIG. 5), a first RLC 751 (for example, the first RLC 521 of FIG. 5), a first MAC 761 (for example, the first MAC 531 of FIG. 5), a second RLC 753 (for example, the second RLC 523 of FIG. 5), and a second MAC 763 (for example, the second MAC 533 of FIG. 5).

According to various embodiments, the controller 710 may control various software or hardware elements (for example, the PDCP sequence number allocation unit 720, the PDCP PDU distribution unit 730, the PDCP 740, the first RLC 751, the second RLC 753, the first MAC 761, and the second RLC 763) included in the wireless communication module 192. According to an embodiment, the controller 710 may be a hardware element (for example, the first communication processor 212 or the second communication processor 214 of FIG. 2) or a software element. When the controller 710 is a software element, the controller 710 may be included in the wireless communication module 192. For example, the controller 710 may be executed by the communication processor (for example, the second communication processor 214) included in the wireless communication module 192.

According to various embodiments, the PDCP 740 may split data and generate a plurality of data units. The PDCP 740 may transmit at least some of the plurality of data units to the first RLC 751 corresponding to first cellular communication and transmit at least some of the plurality of data units to the second RLC 753 corresponding to second cellular communication in response to a determination to use a split bearer. An operation in which the PDCP 740 distributes and transmits data units to the first RLC 751 or the second RLC 753 may be defined as routing.

According to various embodiments, the PDCP 740 may determine the size of data units to be transmitted to the first RLC 751 or the second RLC 753 on the basis of a data processing rate of the first RLC 751 and a data processing rate of the second RLC 753, and transmit the data units to the first RLC 751 and the second RCL 753. The PDCP 740 may perform an operation for determining the size of data units under the control of the PDCP PDU distribution unit 730.

According to various embodiments, the data processing rate of the first RLC 751 may be the size of data which the first RLC 751 transmits to the first MAC 761 for a predetermined time. The data processing rate of the second RLC 753 may be the size of data which the second RLC 753 transmits to the second MAC 763 for a predetermined time.

According to various embodiments, the data processing rate of the first RLC 751 may be the size of data which the first RLC 751 has successfully transmitted to the third RLC 621 corresponding to the first RLC 751 implemented in a receiving side (for example, the BS 620) for a predetermined time. The first RLC 751 may identify the data processing rate of the first RLC 751 on the basis of a signal (ack signal) indicating that the third RLC 621 received data. The data processing rate of the second RLC 753 may be the size of data which the second RLC 753 has successfully transmitted to the fourth RLC 623 corresponding to the second RLC 753 implemented in the receiving side (for example, the BS 620) for a predetermined time. The second RLC 753 may identify the data processing rate of the second RLC 753 on the basis of a signal (ack signal) indicating that the fourth RLC 623 received data.

According to various embodiments, the PDCP PDU distribution unit 730 may receive uplink grant information of first cellular communication from the controller 710. The uplink grant information is information on resources (for example, a channel number, a channel bandwidth, and channel frequency band) used by the electronic device 101 to transmit data through first cellular communication and may include the size of data which can be transmitted through first cellular communication. The PDCP PDU distribution unit 30 may determine the size of data units to be transmitted to the first RLC 751 on the basis of the uplink grant information of first cellular communication.

According to various embodiments, the PDCP PDU distribution unit 730 may receive the data processing rate of the first RLC 751 and the data processing rate of the second RLC 753 from the controller 710 and determine a ratio of the size (volume) of data units to be transmitted to the first RLC 751 or the second RLC 753. The PDCP PDU distribution unit 730 may determine the size of data units to be transmitted to the second RLC 753 on the basis of the ratio between the data processing rate of the first RLC 751 and the data processing rate of the second RLC 753. For example, the PDCP PDU distribution unit 730 may determine that a value obtained by multiplying the size of data units to be transmitted to the second RLC 753 and the ratio between the data processing rate of the first RLC 751 and the data processing rate of the second RLC 753 is the size of data units to be transmitted to the second RLC 753.

According to various embodiments, the data processing rate of the first RLC 751 may be attributes that represent a data transmission rate performed through first cellular communication. The data processing rate of the second RLC 753 may be attributes that represent a data transmission rate performed through second cellular communication. The PDCP PDU distribution unit 730 may identify the data processing rate of the first RLC 751 and the data processing rate of the second RLC 753 and transmit the relatively larger number of data units to an RLC (for example, the second RLC 753) having a relatively higher data processing rate, so that a receiving side (for example, the PDCP (for example, the PDCP 625 of FIG. 6) of the second node 420) may rapidly receive the data units. The above operation may prevent a preset timer in the receiving side (for example, the PDCP (for example, the PDCP 625 of FIG. 6) of the second node 420) from being activated and may improve the data processing rate of the PDCP 625.

According to various embodiments, the PDCP 740 may assign sequence numbers of data units to be transmitted to the first RLC 751 or the second RLC 753 under the control of the PDCP sequence number allocation unit 720.

According to various embodiments, the PDCP sequence number allocation unit 720 may receive the data processing rate of the first RLC 751 and the data processing rate of the second RLC 753 from the controller 710. The PDCP sequence number allocation unit 720 may assign the sequence number to each of the data units so that the receiving side (for example, the BS 620) receives the data units as sequentially as possible. The operation in which the receiving side sequentially receives the data units may mean that data units are sequentially received in the order of sequence numbers allocated to a plurality of data units. The PDCP sequence number allocation unit 720 may configure the sequence numbers on the basis of the data processing rate of the first RLC 751 and the data processing rate of the second RLC 753 so that the data units are sequentially received in the order of allocated sequence numbers.

According to various embodiments, the sequence number assigned by the PDCP sequence numeral allocation unit 720 may be stored in a header included in the data unit.

According to various embodiments, the data processing rate of the first RLC 751 may be attributes that represent a data transmission rate performed through first cellular communication. The data processing rate of the second RLC 753 may be attributes that represent a data transmission rate performed through second cellular communication. The PDCP sequence number allocation unit 720 may identify the data processing rate of the first RLC 751 and the data processing rate of the second RLC 753 and assign a relatively small sequence number to an RLC (for example, the second RLC 753) having a relatively higher data processing rate, so that a data unit corresponding to a relatively small sequence number arrives at a receiving side (for example, the PDCP (for example, the PDCP 625 of FIG. 6) of the second node 420) earlier than a data unit corresponding to a relatively large sequence number. The above operation may prevent a preset timer in the receiving side (for example, the PDCP (for example, the PDCP 625 of FIG. 6) of the second node 420) from being activated and may improve the data processing rate of the PDCP 625.

FIG. 7B illustrates an embodiment in which a first RLC (for example, the first RLC 751 of FIG. 7A) of the electronic device according to various embodiments processes data units.

According to various embodiments, a PDCP PDU distribution unit (for example, the PDPC PDU distribution unit 730 of FIG. 7A) may generate a set of data units having consecutive sequence numbers, the data units being able to be transmitted through only one transmission on the basis of uplink grant information. The size of the set of data units may be determined on the basis of uplink grant information 771 corresponding to a primary path of the data. The uplink grant information 771 may include the maximum size of data which can be transmitted during one period. The set of data units may include data units having consecutive sequence numbers.

According to various embodiments, the first RLC 751 may receive data units 631, 632, 635, and 636 which can be transmitted through first cellular communication from a PDCP (for example, the PDCP 740 of FIG. 7A). The first RLC 751 may group data units to be transmitted on the basis of the uplink grant information 771 of first cellular communication. The uplink grant information 771 may include the maximum size of data which can be transmitted during one period. FIG. 7B assumes for convenience of description that the maximum size of data which can be transmitted during one period is larger than or equal to the size of two data units and equal to or smaller than three data units, and the number of data units transmitted to the first RLC 751 is twice the number of data units transmitted to the second RLC (for example, the second RLC 753 of FIG. 7C).

According to various embodiments, when the electronic device (for example, the electronic device 101 of FIG. 1) transmits data through a split bearer, there may be a difference between a sequence number of a data unit transmitted in this period and a sequence number of a data unit to be transmitted in a next period. For example, there may be a gap between sequence numbers (no. 1 and no. 2) of data units 631 and 632 to be transmitted through first cellular communication in this period and sequence numbers (no. 5 and no. 6) of data units 635 and 636 to be transmitted through first cellular communication in the next period. In this case, the first RLC 751 may transmit at least some of the data unit 635 having the sequence number 5 in this period or transmit the data unit 635 having the sequence number 5 in the next period rather than in this period.

According to various embodiments, the first RLC 751 may determine whether to split the data unit 635 on the basis of the difference (gap) between the sequence number of the data unit to be transmitted in the next period and the sequence number of the data unit to be transmitted in this period. For example, the first RLC 751 may determine whether to split the data unit 635 in consideration of a difference between a data transmission rate using second cellular unit (for example, the data processing rate of the second RLC (for example, the second RLC 753 of FIG. 7A)) and a data transmission rate using first cellular communication (for example, the data processing rate of the first RLC 751).

According to various embodiments, when the difference between the data transmission rate using the second cellular communication and the data transmission rate using the first cellular communication is large (for example, when the difference between this period and the next period is large enough to activate a preset timer if a receiving side (for example, the BS 620) receives some of the data unit 635 in this period and receives others of the data unit 635 in the next period), the data processing rate on the receiving side may further increase in the case in which the data unit 635 is transmitted in the next period rather than the case in which some of the data unit 635 is transmitted in this period.

According to various embodiments, when the difference between the data transmission rate using the second cellular communication and the data transmission rate using the first cellular communication is not large (for example, when the difference between this period and the next period is not large enough to activate a preset timer if a receiving side (for example, the BS 620) receives some of the data unit 635 in this period and receives others of the data unit 635 in the next period), the data processing rate on the receiving side may further increase in the case in which some of the data units split from the data unit 635 are transmitted in this period and others thereof are transmitted in the next period rather than the case in which all of the data units are transmitted in the next period.

According to various embodiments, the first RLC 751 may perform padding processing of aggregating the data units 631 and 632 and other data that is not the data unit and generate data 780 obtained by aggregating the data units 631 and 632 and padding 772 in response to a determination not to split the data unit 635. The size of aggregated data may be the size obtained by subtracting the size of data which can be transmitted during one period from the size of data units 631 and 632.

According to various embodiments, the first RLC 751 may perform padding processing of aggregating data units 635 and 636 and other data that is not the data unit and generate data 781 obtained by aggregating the data units 635 and 636 and padding 773.

According to various embodiments, the first RLC 751 may transmit the generated data 780 and 781 to the first MAC 761. The first MAC 761 may aggregate a header and the received data 780 and 781 and transmit the generated data 782 and 783 to a higher layer (for example, an IP layer).

FIG. 7C illustrates an embodiment in which a second RLC (for example, the second RLC 753 of FIG. 7A) of the electronic device according to various embodiments processes data units.

According to various embodiments, the second RLC 753 may receive data units 634, 635, and 636 to be transmitted through second cellular communication from a PDPC (for example, the PDCP 740 of FIG. 7A). The second MAC 763 may group data units to be transmitted on the basis of uplink grant information 790 of second cellular communication. The uplink grant information 790 may include the maximum size of data which can be transmitted during one period. FIG. 7C assumes for convenience of description that the maximum size of data which can be transmitted during one period is larger than or equal to the size of two data units and equal or smaller than the size of three data units.

According to various embodiments, the second MAC 763 may determine whether to split the data unit 636 in consideration of the difference (gap) between the sequence unit of the data unit to be transmitted in the next period and the sequence number of the data unit to be transmitted in this period. For example, the second MAC 763 may determine whether to split the data unit 636 in consideration of a difference between a data transmission rate using second cellular communication (for example, the data processing rate of the second RLC (for example, the second RLC 753 of FIG. 7A)) and a data transmission rate using first cellular communication (for example, the data processing rate of the first RLC 751).

According to various embodiments, when the difference between the data transmission rate using the second cellular communication and the data transmission rate using the first cellular communication is large (for example, when the difference between this period and the next period is large enough to activate a preset timer if a receiving side (for example, the BS 620) receives some of the data unit 635 in this period and receives others of the data unit 635 in the next period), the data processing rate on the receiving side may further increase in the case in which the data unit 636 is transmitted in the next period rather than the case in which some of the data unit 636 is transmitted in this period.

According to various embodiments, when the difference between the data transmission rate using the second cellular communication and the data transmission rate using the first cellular communication is not large (for example, when the difference between this period and the next period is not large enough to activate a preset timer if a receiving side (for example, the BS 620) receives some of the data unit 635 in this period and receives others of the data unit 635 in the next period), the data processing rate on the receiving side may further increase in the case in which some of the data units split from the data unit 636 are transmitted in this period and others thereof are transmitted in the next period rather than the case in which all of the data units are transmitted in the next period.

According to various embodiments, the second MAC 763 may perform padding process of aggregating the data units 634 and 635 and other data which is not the data unit in response to a determination not to split the data unit 636. The size of aggregated data may be the size obtained by subtracting the size of data which can be transmitted during one period from the size of data units 634 and 635.

FIG. 7D illustrates an embodiment in which a PDCP sequence number allocation unit (for example, the PDCP sequence number allocation unit 720 of FIG. 7A) of the electronic device according to various embodiments assigns sequence numbers of data units.

According to various embodiments, the PDCP sequence number allocation unit 720 may assign the sequence number to each of the data units so that a receiving side (for example, the BS 620) receives the data units as sequentially as possible. The operation in which the receiving side sequentially receives the data units may mean that data units are sequentially received in the order of sequence numbers allocated to a plurality of data units. The PDCP sequence number allocation unit 720 may configure the sequence numbers on the basis of the data processing rate of the first RLC 751 and the data processing rate of the second RLC 753 so that the data units are sequentially received in the order of allocated sequence numbers.

According to various embodiments, the PDCP sequence number allocation unit 720 may assign the sequence number such that data units having relatively large sequence numbers (trailing sequence numbers) are not transmitted to the receiving side earlier than data units having relatively small sequence numbers (leading sequence numbers). The PDCP sequence number allocation unit 720 may assign sequence numbers such that a plurality of data units included in the set of data units have sequential sequence numbers. The PDCP sequence number allocation unit 720 may assign a small sequence number to the data unit to be transmitted to an RLC having a faster data processing rate on the basis of the data processing rate of the first RLC 751 and the data processing rate of the second RLC 753. Referring to FIG. 7D, it is assumed that the data processing rate of the first RLC/MAC 615 is half the data processing rate of the second RLC/MAC 617. The PDCU sequence number allocation unit 720 may allocate small sequence numbers to data units 631, 632, 633, and 634 to be transmitted to the second RLC 753 having a faster data processing rate and allocate relatively large sequence numbers to data units 635 and 636 to be transmitted to the first RLC 751 having a relatively slow data processing rate. Through the above scheme, the PDCP 625 of the BS 620 may successively receive the plurality of data units 631, 632, 633, 634, 635, and 636 according to the sequence numbers thereof.

According to various embodiments, when data units are transmitted between layers included in the electronic device 610 and the BS 620, headers included in the data units 631, 632, 633, 634, 635, and 636 may be changed by elements included in the layers.

FIG. 7E illustrates the case in which the electronic device according to various embodiments implements a plurality of logical channels in uplink resources used for data transmission.

Referring to FIG. 7E, the electronic device (for example, the electronic device 101 of FIG. 1) uses a plurality of logical channels 771-*a*, 771-*b*, and 771-*n* to transmit data to a receiving side (for example, the first node 410 or the second node 420 of FIG. 4A).

According to various embodiments, the electronic device 101 may use the plurality of logical channels 771-*a*, 771-*b*, and 771-*n* included in one uplink grant 771 to which resources available by the electronic device 101 are allocated. For example, the electronic device 101 may transmit data through one channel (for example, 771-*a*) of the plurality of logical channels 771-*a*, 771-*b*, and 771-*n* and transmit various signals (for example, a control signal or an ack signal) through another channel (for example, 771-*b*).

According to various embodiments, the electronic device 101 may identify a processing rate of an RLC (for example, the first RLC 751 or the second RLC 753) for data corresponding to each of the plurality of logical channels 771-*a*, 771-*b*, and 771-*n*, and distribute and assign sequence numbers to data units on the basis of the processing rate.

FIG. 7F illustrates an embodiment in which the electronic device according to various embodiments transmits data through only one path because the other one of two transmission paths has a problem.

Referring to FIG. 7F, the electronic device (for example, the electronic device 101 of FIG. 1) cannot temporarily transmit data through first cellular communication due to a temporary problem of a data transmission path using first cellular communication. FIG. 7F illustrates a situation in which the problem occurs when some data units 631 and 632 have been completely received.

The electronic device (for example, the electronic device 101 of FIG. 1) according to various embodiments may transmit the plurality of data units 633, 634, 635, and 636 to the RLC (for example, the second RLC 623) corresponding to a data transmission path (for example, a data transmission path using second cellular communication) through which data can be transmitted. The electronic device 101 may smoothly transmit data in the state in which a bearer type is maintained through the above method without making an unnecessary change of the bearer type (for example, a change from a split bearer to a secondary cell group bearer). Through the above scheme, the PDCP 625 of the BS 620 may successively receive the plurality of data units 631, 632, 633, 634, 635, and 636 according to the sequence numbers thereof.

FIG. 8 illustrates an embodiment in which the electronic device according to various embodiments distributes data and designates sequences thereof on the basis of data processing rates of a first RLC and a second RLC.

FIG. 8 illustrates an embodiment in which the electronic device 610 (for example, the electronic device 101 of FIG. 1) transmits data to a second node (for example, the second node 420 of FIG. 4A).

According to various embodiments, the higher layer 611 (for example, an application layer) of the electronic device 610 may transmit data, to be transmitted to the second node 420, to the PDCP 613 (for example, the PDCP entity 511 of FIG. 5). The PDCP 613 may generate data units 631, 632, 633, 634, 635, and 636 by splitting received data 630.

According to various embodiments, the PDCP 611 may determine whether to use a split bearer on the basis of the size of data to be transmitted. A detailed embodiment in which the PDCP 613 determines whether to use a split bearer will be described below with reference to FIGS. 9 to 13. According to another embodiment, the PDCP 611 may compare an uplink data split threshold value (ul-datasplit-threshold) received from the first node 410 or the second node 420 with the size of data and determine whether to use a split bearer on the basis of the comparison result.

According to various embodiments, the PDCP 613 may transmit at least some data units 633 and 636 among data units 631, 632, 633, 634, 635, and 636 to a first RLC (for example, the first RLC 521 of FIG. 5). The PDCP PDU distribution unit (for example, the PDCP PDU distribution unit 730 of FIG. 7) may receive uplink grant information 810 of first cellular communication from the controller (for example, the controller 710 of FIG. 7) and determine the size of data units to be transmitted to the first RLC 521 on the basis of the uplink grant information of the first cellular communication. The PDCP 611 may transmit some data units to the first RLC 521 on the basis of information on the size of data units determined by the PDCP PDU distribution unit 730.

FIG. 8 assumes for convenience of description that the size of data, which can be transmitted through first cellular communication, included in the uplink grant information of the first cellular communication corresponds to two data units and a data processing rate of the first RLC 521 is half a data processing rate of the second RLC 523.

According to various embodiments, the PDCP 611 may determine to transmit two data units of a plurality of data units 631, 632, 633, 634, 635, and 636 to the first RLC 521 on the basis of uplink grant information 810 of first cellular communication. The PDCP 613 may determine to transmit four data units of a plurality of data units 631, 632, 633, 634, 635, and 636 to the second RLC 531 on the basis of the data processing rate of the first RLC 521 and the data processing rate of the second RLC 523.

According to various embodiments, the PDCP 613 may assign sequence numbers of data units to be transmitted to the first RLC 521 or the second RLC 523 under the control of the PDCP sequence number allocation unit (for example, 720 of FIG. 7). The PDCP sequence number allocation unit 720 may receive the data processing rate of the first RLC 751 and the data processing rate of the second RLC 753 from the controller 710. The PDCP sequence number allocation unit 720 may assign the sequence number to each of the data units so that the receiving side (for example, the BS 620) receives the data units as sequentially as possible. The operation in which the receiving side sequentially receives the data units may mean that data units are sequentially received in the order of sequence numbers allocated to a plurality of data units. The PDCP sequence number allocation unit 720 may configure the sequence numbers on the basis of the data processing rate of the first RLC 521 and the data processing rate of the second RLC 523 so that the data units are sequentially received in the order of allocated sequence numbers.

Referring to FIG. 8, for example, the PDCP sequence number allocation unit 730 may assign sequence numbers 1 and 2 to data units 631 and 632 which should be transmitted earlier among the four data units to be transmitted to the second RLC 523. The PDCP sequence number allocation unit 730 may assign sequence number 3 to the data unit 633 which should be transmitted earlier among the two data units to be transmitted to the first RLC 521. The PDCP sequence number allocation unit 730 may assign sequence numbers 4 and 5 to data units 634 and 635 which should be transmitted later among the four data units to be transmitted to the second RLC 523. The PDCP sequence number allocation unit 730 may assign sequence number 6 to the data unit 636 which should be transmitted later among the two data units to be transmitted to the first RLC 521.

It may be determined to transmit two data units to the first RLC 521 among the plurality of data units 631, 632, 633, 634, 635, and 636 on the basis of uplink grant information of first cellular communication. The PDCP 611 may determine to transmit four data units of a plurality of data units 631, 632, 633, 634, 635, and 636 to the second RLC 531 on the basis of the data processing rate of the first RLC 521 and the data processing rate of the second RLC 523.

In the embodiment of FIG. 6, the total number of data units 631, 632, and 633 which the first MAC/RLC 615 should transmit to the receiving side (for example, the BS 620) may be three. When it is assumed that the number of data units which can be transmitted through first cellular communication at once is two, the data unit 633 may be transmitted relatively late. The total number of data units 634, 635, and 636 which the second MAC/RLC 617 should transmit to the receiving side 620 may be three. In consideration of the data processing rate of the second cellular communication which is twice the data processing rate of the first cellular communication, the data units 634, 635, and 636 may arrive at the PDCP 625 of the receiving side 620. In this case, the PDCP 625 may identify that some 533 of the data units has not yet been received, activate a preset timer (t-reordering timer), and stand by until the timer expires without performing an operation for aggregating the data units, and the data processing rate of the PDCP 625 may decrease.

On the other hand, in the embodiment of FIG. 8, the total number of data units 631 and 632 which the first MAC/RLC 615 should transmit to the receiving side (for example, the BS 620) may be two, and the total number of data units 633, 634, 635, and 636 which the second MAC/RLC 617 should transmit to the receiving side 620 may be four. When it is assumed that the number of data units which can be transmitted through first cellular communication at once is two and the number of data units which can be transmitted through second cellular communication at once is four, there may be no data unit transmitted late in comparison with the embodiment of FIG. 6. In this case, the PDCP 625 may aggregate the data units 631, 632, 633, 634, 635, and 636 without activating the timer and transmit the aggregated data units to the higher layer 627. Accordingly, the data processing rate of the PDCP 625 may increase relative to the embodiment of FIG. 6.

FIG. 9 illustrates a flowchart of an operation of a first mode in which the electronic device according to various embodiments selects a data transmission path on the basis of the size of data to be transmitted and the size of successfully transmitted data per unit time.

According to various embodiments, a PDCP (for example, the PDCP entity 511 of FIG. 5) implemented in a wireless communication module (for example, the wireless communication module 192 of FIG. 1) of an electronic device (for example, the electronic device 101 of FIG. 1) may determine whether to transmit data through a primary RLC entity configured as a primary path or transmit data through the primary RLC entity configured as the primary path or/and a secondary RLC entity configured as a second path except for the primary path on the basis of the result of comparison between the size of data to be transmitted and an uplink data split threshold value (ul-datasplitthreshold). For convenience of description, a data transmission path using first cellular communication is defined as a primary path, and a data transmission path using second cellular communication is defined as a secondary path.

According to various embodiments, the size of data to be transmitted may be defined as a sum of the size of data temporarily stored in the PDCP 511, the size of data temporarily stored in the first RLC (for example, the first RLC 521 of FIG. 5), and the size of data temporarily stored in the second RLC (for example, the second RLC 523 of FIG. 5).

According to various embodiments, the uplink data split threshold value is a value defined in the NR standard specification (for example, 3GPP TS 37.340) and may be a value to be compared with to determine whether to split data. For example, when the size of data to be transmitted is larger than or equal to the uplink data split threshold value, the wireless communication module 192 may transmit data through all of a plurality of paths. In another example, when the size of data to be transmitted is smaller than the uplink data split threshold value, the wireless communication module 192 may transmit data through the primary path. The uplink data split threshold value may be received from a first node (for example, the first node 410 of FIG. 4A) or a second node (for example, the second node 420 of FIG. 4A) connected to the electronic device 101. The uplink data split threshold value may be implemented as [Table 1] below.

TABLE 1

| NR Strength (RSRP/RSRQ) | ul-DataSplitThreshold | Primary path |
|---|---|---|
| NR Strong (default) | b0 | SN (second node) |
| NR A2 Event (event indicating that the electronic device 101 receives a signal indicating the escape from the coverage of second cellular communication) | Infinity | MN (first node) |
| NR A1 Event (event indicating that the electronic device 101 receives a signal indicating entry into the coverage of second cellular communication) | b0 | SN (second node) |

According to various embodiments, the uplink data split threshold value is a value received from the BS (for example, the first node 410 or the second node 420) and may be configured with no consideration of a state of the electronic device 101.

According to a comparative example, when the BS configures the uplink data split threshold value with no consideration of the state of the electronic device 101, the situation in which the uplink data split threshold value is lower than the size of successfully transmitted data per unit time through the primary path may be generated. When the uplink data split threshold value is lower than the size of successfully transmitted data per unit time through the primary path, the situation in which data should be transmitted through both the primary path and the secondary path even though the data can be transmitted through only the primary path may be generated. In this case, all of the BS corresponding to the first cellular communication (for example, the first node 410) and the BS corresponding to the second cellular communication (for example, the second node 420) may increase unnecessary power consumption due to an operation of transmitting a buffer status report (BSR) and an operation of transmitting data through both the primary path and the second path.

According to a comparative example, the buffer status report is a value related to the size of data to be transmitted, and the BS may allocate resources to be used by the electronic device 101 to transmit data to the electronic device 101 on the basis of the buffer status report. Each of the first MAC (for example, the first MAC 531 of FIG. 5) and the second MAC (for example, the second MAC 533 of FIG. 5) may generate the buffer status report. The first MAC 531 may generate the buffer status report on the basis of the size of data temporarily stored in the PDCP 511 and the size of data temporarily stored in the first RLC 521. The second MAC 533 may generate the buffer status report on the basis of the size of data temporarily stored in the PDCP 511 and the size of data temporarily stored in the second RLC 523.

In this case, the buffer status report generated by the first MAC 531 and the buffer status report generated by the second MAC 533 may overlappingly consider the size of data temporarily stored in the PDCP 511, and thus a phenomenon in which larger resources compared to the size of actually transmitted data are allocated may be generated.

Hereinafter, a first operation mode of the electronic device 101 for preventing the phenomenon will be described.

According to various embodiments, the first operation mode may be an operation mode in which the PDCP 511 transmits data temporarily stored in the PDCP 511 to the first RLC 521 or the second RLC 523 to make the data temporarily stored in the PDCP 511 removed therefrom.

According to various embodiments, in operation 910, the PDCP 511 may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, in operation 920, the PDCP 511 may compare the size of the data identified in operation 910 with a first configuration value. The PDCP 511 may identify whether the size of the data is smaller than a preset value.

According to various embodiments, the first configuration value may be a value related to the size of successfully transmitted data per unit time through the primary path. The first configuration value may be a maximum value of the size of data which can be transmitted through only one path. The size of successfully transmitted data per unit time may be a value related to the number of bytes of data which can be transmitted through one transport block (TB). The size of successfully transmitted data per unit time may be influenced by a channel state (or quality) of the primary path, a modulation coding scheme (MCS), a coding rate, network congestion, an uplink scheduling frequency of the UE, or the number of resource blocks (RBs) allocated to the electronic device 101.

According to various embodiments, the PDCP 511 may determine a value that represents an amount of successfully transmitted data per unit time through the primary path as the first configuration value. The PDCP 511 may determine the first configuration value on the basis of the size of transmitted data per unit time corresponding to the uplink grant and the size of data which can be maximally transmitted per time unit.

According to various embodiments, the size of transmitted data per unit time may be the average of the size of data transmitted in each of a plurality of slots. The PDCP 511 may continuously track the size of transmitted data per unit time and determine the average of sizes of tracked data as the size of transmitted data per unit time corresponding to the uplink grant.

According to various embodiments, the size of data which can be maximally transmitted per unit time may be the maximum size of data which can be transmitted while being inserted into one slot or frame. The maximum size of data which can be transmitted may be determined in consideration of a maximum MCS, the maximum number of antennas which can be used for data transmission, and the size of transport blocks (TBs) when the electronic device 101 receives allocation of the maximum number of resource blocks.

According to various embodiments, the PDCP 511 may determine the first configuration value to be larger than the size of transmitted data per unit time corresponding to the uplink grant and smaller than the size of data which can be maximally transmitted per time unit. Even when the size of data to be transmitted is large enough to use two paths, the PDCP 511 may determine or modify the first configuration value to prevent the situation in which only one path is used.

According to various embodiments, the PDCP 511 may determine whether to transmit data through a plurality of paths (for example, the primary path or the secondary path) on the basis of the first configuration value instead of the uplink data split threshold value.

The PDCP 511 may configure a preset value such that the first configuration value increases as the size of successfully transmitted per unit time increases. The PDCP 511 may determine the first configuration value on the basis of a communication quality (for example, a communication state) corresponding to the primary path and a communication quality corresponding to the secondary path. When the communication state of the primary path is good, the PDCP 511 may configure the first configuration value to be larger than the uplink data split threshold value. According to various embodiments, the unit time may be defined as a period on which the electronic device 101 receives the uplink data split threshold value from the BS (the first node 410 or the second node 420).

According to various embodiments, in operation 930, the PDCP 511 may transmit data to one RLC in response to identification that the size of data is smaller than the first configuration value.

According to various embodiments, when the size of data is not smaller than the first configuration value, it may mean that the data to be transmitted can be transmitted through only one path (for example, the primary path) without through all of a plurality of paths (for example, the primary path and the secondary path). The PDCP 511 may transmit data through only the RLC corresponding to the primary path (for example, the first RLC 521 when first cellular communication is used as the primary path and the second RLC 523 when second cellular communication is used as the primary path) regardless of the data size larger than and smaller than the uplink data split threshold value. The PDCP 511 may not transmit data through the other RLC (for example, the second RLC 523 when first cellular communication is used as the primary path and the first RLC 512 when second cellular communication is used as the primary path).

According to various embodiments, the PDCP 511 may rapidly transmit data temporarily stored in the PDCP 511 to the RLC corresponding to the primary path, thereby reducing the size of data temporarily stored in the PDCP 511 to be close to 0. Through the above scheme, the MAC connected to the RLC (for example, the second RLC 523 when first cellular communication is used as the primary path and the first RLC 521 when second cellular communication is used as the primary path) corresponding to another path, which is not the primary path, may identify 0 as the data size and transmit the buffer status report. Through the above scheme, the size of the data temporarily stored in the PDCP 511 may not be overlappingly considered, and the phenomenon of allocating larger resources compared to the size of actually transmitted data may be prevented.

According to various embodiments, in operation 940, the PDCP 511 may transmit data to the first RLC 521 and the second RLC 523 in response to identification that the size of data is larger than or equal to the first configuration value.

According to various embodiments, the case in which the size of data is larger than or equal to the first configuration value may mean that the data transmission rate is reduced if data is transmitted through only the primary path. In this case, the PDCP 511 may transmit data through all of a plurality of paths. The PDCP 511 may transmit at least some of the data units generated by splitting data to the first RLC 521 and transmit others of the data units to the second RLC 523.

Figure 10A:
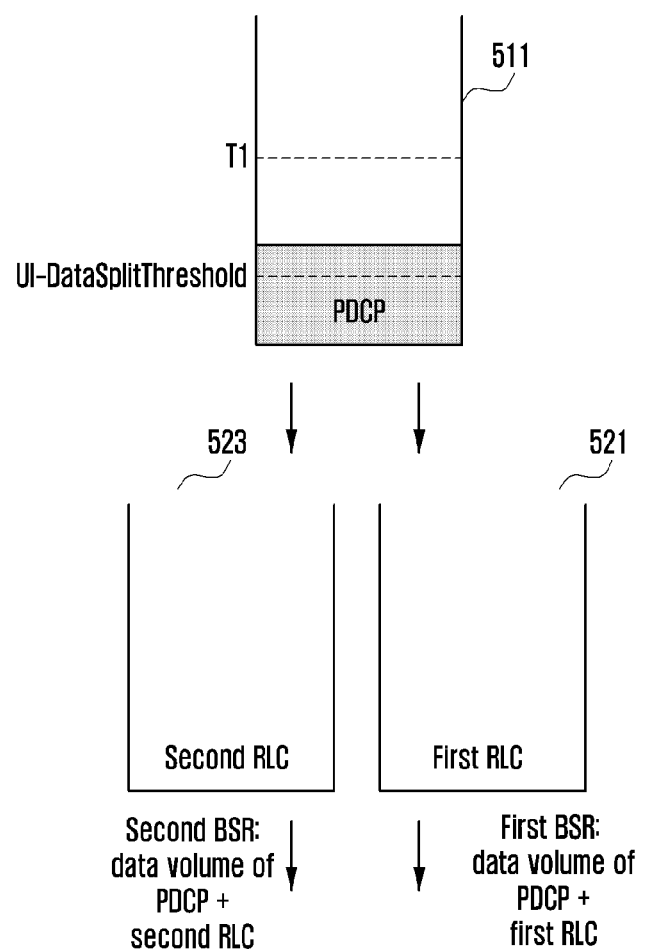
FIG. 10A illustrates the first operation mode illustrated in FIG. 10 in the electronic device according to various embodiments and FIG. 10B illustrates the first operation mode illustrated in FIG. 10 in the electronic device according to various embodiments.
Figure 10B:
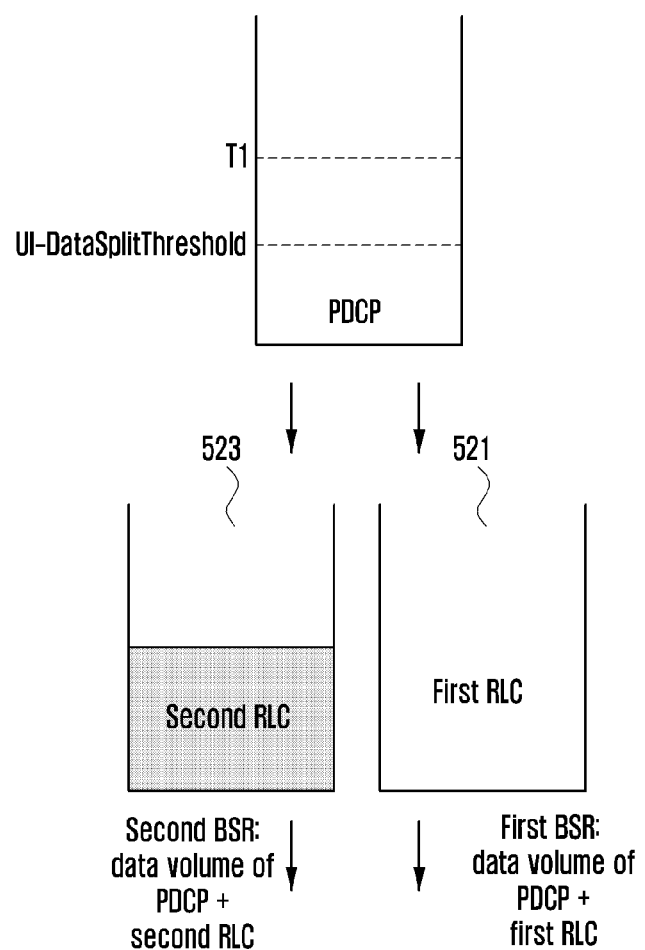

FIG. 10A illustrates a comparative example in which the electronic device according to various embodiments does not use the first operation mode illustrated in FIG. 9, and FIG. 10B illustrates an embodiment in which the electronic device according to various embodiments uses the first operation mode illustrated in FIG. 9

For convenience of description, FIGS. 10A and 10B assume that a data transmission path using second cellular communication is the primary path.

The comparative example illustrated in FIG. 10A corresponds to the case in which the electronic device 101 does not operate in the first operation mode, in which case the size of data to be transmitted is larger than or equal to the uplink data split threshold value.

Referring to FIG. 10A, a PDCP (for example, the PDCP 511 of FIG. 5) may identify the size of data to be transmitted. The PDCP 511 may identify the size of data to be transmitted on the basis of a sum of the size of data temporarily stored in the PDCP 511, the size of data temporarily stored in the first RLC (for example, the first RLC 521 of FIG. 5), and the size of data temporarily stored in the second RLC (for example, the second RLC 523 of FIG. 5).

According to various embodiments, the size of data to be transmitted may be larger than the uplink data split threshold value (ul-datasplitthreshold) and smaller than the first configuration value. When the size of data is smaller than the first configuration value, it may mean that the data can be transmitted through only the primary path without using both the primary path and the secondary path.

According to a comparative example, when the electronic device 101 does not operate in the first operation mode, the electronic device 101 may transmit the data using both the primary path and the secondary path in the situation illustrated in FIG. 10A. In this case, all of the BS corresponding to the first cellular communication (for example, the first node 410) and the BS corresponding to the second cellular communication (for example, the second node 420) may increase unnecessary power consumption due to an operation of transmitting a buffer status report (BSR) and an operation of transmitting data through both the primary path and the second path.

According to various embodiments, the buffer status report is a value related to the size of data to be transmitted, and the BS may assign resources to be used by the electronic device 101 to transmit data to the electronic device 101 on the buffer status report. Each of the first MAC (for example, the first MAC 531 of FIG. 5) and the second MAC (for example, the second MAC 533 of FIG. 5) may generate the buffer status report. The first MAC 531 may generate the buffer status report on the basis of the size of data temporarily stored in the PDCP 511 and the size of data temporarily stored in the first RLC 521. The second MAC 533 may generate the buffer status report on the basis of the size of data temporarily stored in the PDCP 511 and the size of data temporarily stored in the second RLC 523.

According to a comparative example, the buffer status report generated by the first MAC 531 and the buffer status report generated by the second MAC 533 may overlappingly consider the size of data temporarily stored in the PDCP 511, so that larger resources compared to the size of actually transmitted data may be allocated.

The embodiment illustrated in FIG. 10B corresponds to the situation in which the electronic device 101 operates in the first operation mode illustrated in FIG. 9, in which case the size of data to be transmitted may be larger than or equal to the uplink data split threshold value (ul-datasplitthreshold).

According to various embodiments, the PDCP 511 may transmit data temporarily stored in the PDCP 511 to the RLC (for example, the second RLC 523) corresponding to the primary path in response to identification that the size of data is smaller than the first configuration value (T1).

According to various embodiments, the PDCP 511 may rapidly transmit data temporarily stored in the PDCP 511 to the second RLC 523 corresponding to the primary path, thereby reducing the size of the data temporarily stored in the PDCP 511 to be close to 0. Through the above scheme, the first MAC 531 connected to the RLC (the first RLC 521) corresponding to another path, which is not the primary path, may identify 0 as the data size and transmit the buffer status report. The buffer status report transmitted by the first MAC 531 may include information indicating that there is no data to be transmitted. The BS (for example, the first node 410) receiving the buffer status report may identify that there is no data to be transmitted and may not allocate resources for data transmission of the electronic device 101. Through the above scheme, the size of the data temporarily stored in the PDCP 511 may not be overlappingly considered, and the phenomenon of allocating larger resources compared to the size of actually transmitted data may be prevented.

Figure 11:
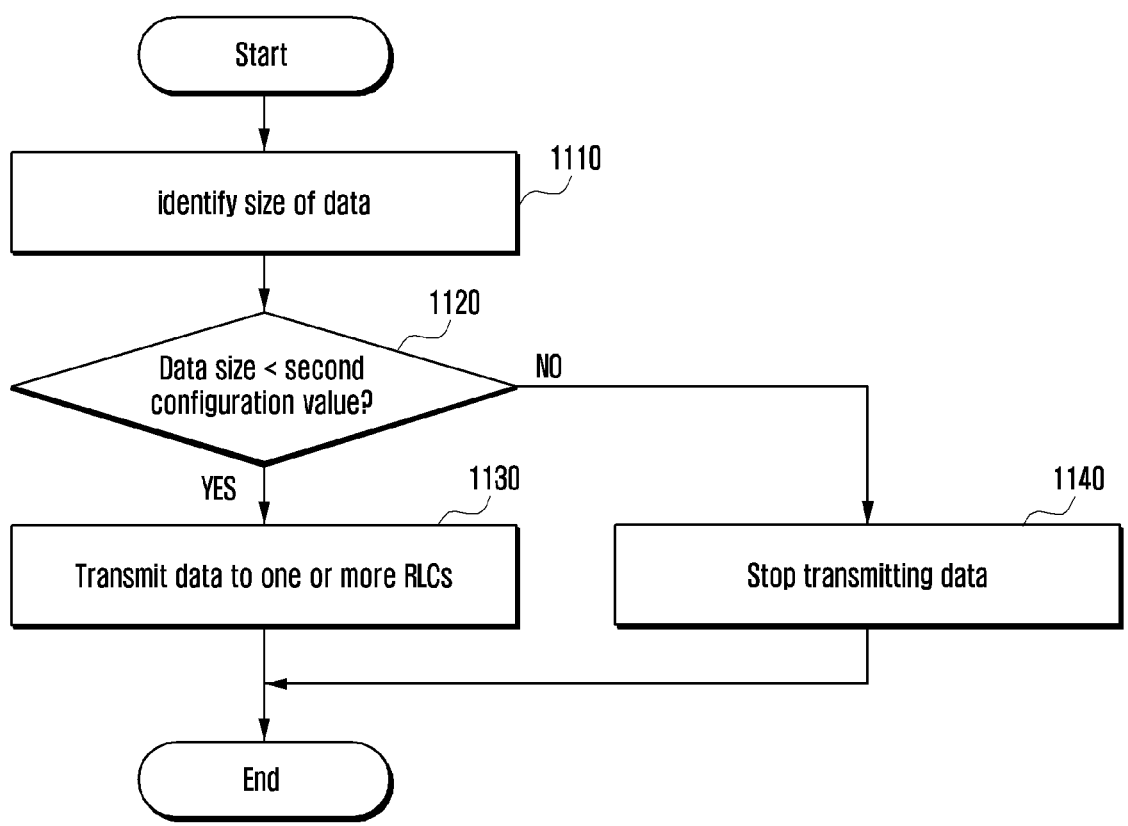
FIG. 11 illustrates a flowchart of the second operation mode in which the electronic device according to various embodiments determines whether to stop data transmission on the basis of the size of data to be transmitted and the size of successfully transmitted data per unit time.

FIG. 11 illustrates a flowchart of a second operation mode in which the electronic device according to various embodiments determines whether to stop data transmission (or routing) from the PDCP to the RLC on the basis of the size of data to be transmitted and the size of successfully transmitted data per unit time.

According to various embodiments, a PDCP (for example, the PDCP entity 511 of FIG. 5) implemented in a wireless communication module (for example, the wireless communication module 192 of FIG. 1) of an electronic device (for example, the electronic device 101 of FIG. 1) may determine whether to transmit data through a primary path or transmit data through both the primary path or/and a second path on the basis of the result of comparison between the size of data to be transmitted and an uplink data split threshold value (ul-datasplitthreshold). An operation in which the PDCP 511 transmits data units to the first RLC 521 or the second RLC 523 may be defined as routing.

According to various embodiments, the uplink data split threshold value is a value received from the BS (for example, the first node 410 or the second node 420) and may be configured with no consideration of a state of the electronic device 101.

According to a comparative example, when the BS configures the uplink data split threshold value with no consideration of the state of the electronic device 101, the uplink data threshold value may be configured to be high or may be higher than the size of successfully transmitted data per unit time through the primary path. When the uplink data split threshold value is higher than the size of successfully transmitted data per unit time through the primary path, the electronic device 101 may transmit data through only the primary path. Such a phenomenon may cause deterioration of the data transmission rate of the electronic device 101.

Further, when the electronic device 101 switches from the state in which data is transmitted through only the primary path to the state in which data is transmitted through all of a plurality of paths, there may be much data temporarily stored in the RLC corresponding to the primary path compared to the data transmission rate using cellular communication corresponding to the primary path. In such a situation, a receiving side (for example, the first node 410 or the second node 420) may receive some of data units later than other thereof, in which case a PDPC (for example, the PDCP 625 of FIG. 6) implemented in the receiving side (for example, the first node 410 or the second node 420) may not receive some data units, a configured timer may be activated, and the receiving side stands by without aggregation of the received data units before the timer is activated, so that the data processing rate of the PDCP 625 may be reduced.

Hereinafter, the second operation mode of the electronic device 101 for preventing the phenomenon will be described.

According to various embodiments, in operation 1110, the PDPC 511 may identify the size of data temporarily stored in the RLC. The size of data temporarily stored in the RLC is the size of data temporarily stored in the RLC corresponding to the primary path or a selected path (for example, the first RLC 521 when first cellular communication is the primary path, and the second RLC 523 when second cellular communication is the primary path), and may be the size of a part of data to be transmitted.

According to various embodiments, in operation 1120, the PDCP 511 may compare the size of data identified in operation 1110 with a second configuration value. The PDCP 511 may identify whether the size of data is smaller than the second configuration value.

According to various embodiments, the second configuration value may be a value related to the size of successfully transmitted data per unit time through the primary path. The size of successfully transmitted data per unit time may be a value related to the number of bytes of data which can be transmitted through one transport block (TB). The size of successfully transmitted data per unit time may be influenced by a channel state of the primary path, a modulation coding scheme (MCS), a coding rate, network congestion, an uplink scheduling frequency of the UE, or the number of resource blocks (RBs) allocated to the electronic device 101. The PDCP 511 may configure a preset value such that the preset value increases as the size of successfully transmitted data per unit time increases.

According to various embodiments, the PDPC 511 may determine a value that represents the maximum size of data, which can be temporarily stored in the RLC (the first RLC 521 or the second RLC 523), as the second configuration value in order to prevent activation of the timer due to a data reception delay of the receiving side (for example, the BS 620 of FIG. 6).

According to various embodiments, the PDCP 511 may determine the second configuration value in consideration of a processing delay time that is a time spent to transmit data from the PDCP 511 to the RLC (the first RLC 521 or the second RLC 523). In order to prevent the situation in which the first MAC 531 or the second MAC 533 cannot transmit data to a higher layer (for example, a PHY layer) at proper timing from being generated due to a processing delay time, the PDCP 511 may configure the second configuration value to be higher than the size of transmitted data per unit time.

According to various embodiments, the PDCP 511 may determine the second configuration value in consideration of a time during which the receiving side waits for reception of some of data units because some of the data units have not been received. When the second configuration value is larger, an amount of data temporarily stored in the RLC side is large, and thus the receiving side may have a waiting time. The PDCP 511 may configure the second configuration value to be smaller than a value determined by [Equation 1] below.

$$TB\_max * t\text{-reordering time/ul grant} \qquad [\text{Equation 1}]$$

(TB_max: denotes the maximum processing size of data processed by the RLC to transmit data through one slot (NR) or one subframe (LTE), t-ordering time: denotes the maximum time during which the receiving side waits for arrangement of received data units according to sequence numbers, ul grant period: denotes the length of one slot or one subframe)

According to various embodiments, the PDCP 511 may configure the second configuration value to be larger than the size of transmitted data per unit time and smaller than the value determined by [Equation 1].

According to various embodiments, the unit time may be defined as a period on which the electronic device 101 receives the uplink data split threshold value from the BS (the first node 410 or the second node 420).

According to various embodiments, in operation 1130, the PDCP 511 may transmit data to the RLC in response to identification that the size of data is smaller than the second configuration value. When the PDCP 511 is transmitting data to the RLC (the first RLC 521 or the second RLC 523), the PDCP 511 may maintain the data transmission operation.

According to various embodiments, in operation 1140, the PDCP 511 may stop the operation of transmitting data to the RLC in response to identification that the size of data is larger than or equal to the second configuration value.

According to various embodiments, the PDCP 511 may stop transmission of data stored in the PDCP 511 to maintain the size of data stored in the RLC (for example, the first RLC 521 or the second RLC 523) to be equal to or smaller than the second configuration value or reduce a transmission rate of data transmitted (or routed) from the PDCP 511 to the RLC (for example, the first RLC 521 or the second RLC 523).

According to various embodiments, the PDCP 511 may transmit the data again in response to identification that the data stored in the RLC 521 or 523 is reduced to be equal to or smaller than the second configuration value.

According to various embodiments, the PDCP 511 may perform the second operation mode independently from each of the first RLC 521 and the second RLC 523. In this case, second configuration values configured in the first RLC 521 and the second RLC 523 may be different from each other. The second configuration value corresponding to the first RLC 521 may be configured differently according to a channel state of first cellular communication corresponding to the first RLC 521, and the second configuration value corresponding to the second RLC 523 may be configured differently according to a channel state of second cellular communication corresponding to the second RLC 523.

Figure 12A:
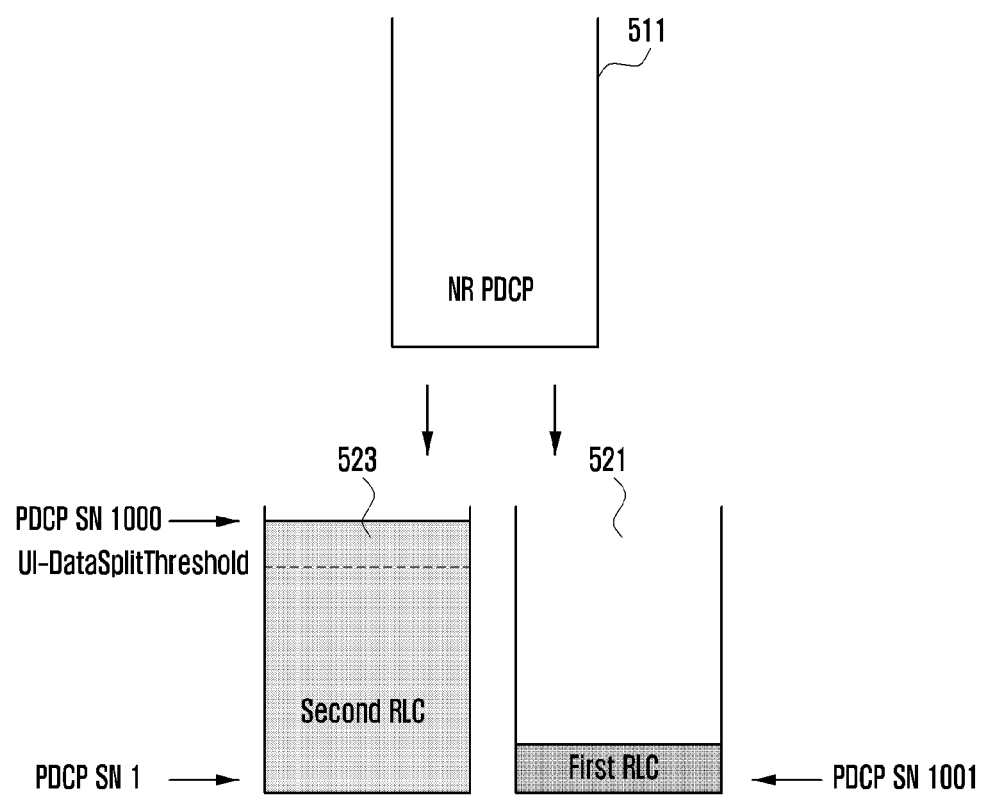
FIG. 12A illustrates the second operation mode illustrated in FIG. 12 in the electronic device according to various embodiments and FIG. 12B illustrates the first operation mode illustrated in FIG. 12 in the electronic device according to various embodiments.
Figure 12B:
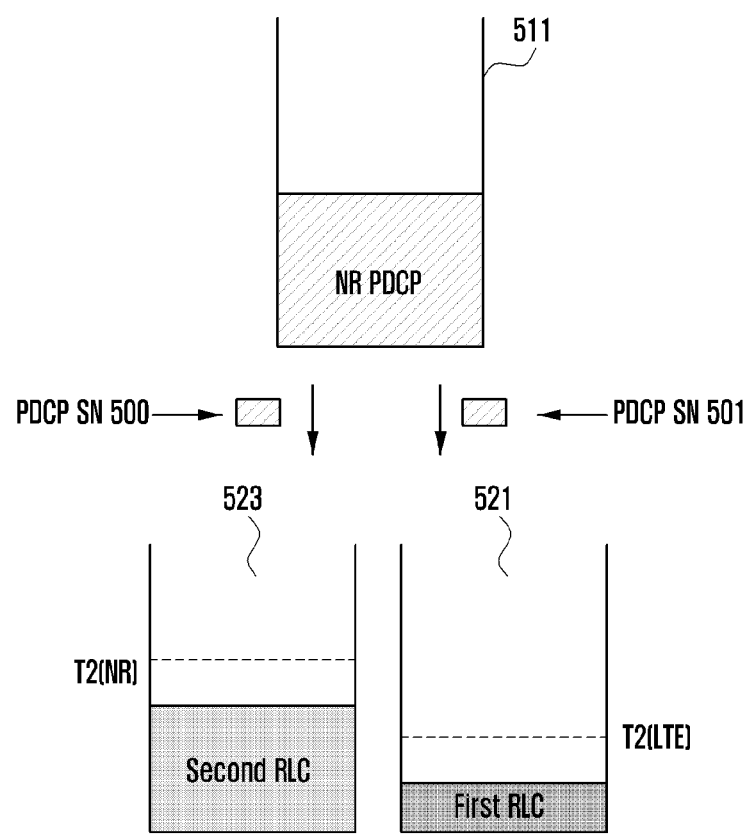

FIG. 12A illustrates a comparative example in which the electronic device according to various embodiments does not use the second operation mode illustrated in FIG. 11, and FIG. 12B illustrates an embodiment in which the electronic device according to various embodiments uses the second operation mode illustrated in FIG. 11.

For convenience of description, FIGS. 12A and 12B assume that a data transmission path using second cellular communication is the primary path.

The comparative example illustrated in FIG. 12A illustrates a situation in which the electronic device 101 does not operate in the second operation mode.

According to various embodiments, the PDCP 511 may transmit data to the second RLC 523 corresponding to the primary path in response to identification that the size of data to transmitted is equal to or smaller than the uplink data split threshold value.

When a data processing rate of the second RLC 523 is slower than a data transmission rate from the PDCP 511 to the second RLC 523, the size of data stored in the second RLC 523 may increase. The PDCP 511 may transmit data through a split bearer in response to identification that the size of data to be transmitted (a sum of the size of data stored in the PDCP 511, the size of data stored in the first RLC 521, and the size of data stored in the second RLC 523) is larger than or equal to the uplink data split threshold value.

Referring to FIG. 12A, sequence numbers of data that should be transmitted from the second RLC 523 may be 1 to 1000, and a sequence number of data that should be transmitted from the first RLC 521 may be 1001. In this case, the receiving side (for example, the first node 410 or the second node 420) may receive some of the data units later than others thereof. For example, the receiving side may receive data having sequence numbers 1 to 500 through second cellular communication and data having sequence number 1001 through first cellular communication. The receiving side may not receive data having sequence numbers 501 to 999. In this case, as the PDPC (for example, the PDCP 625 of FIG. 6) implemented in the receiving side (for example, the first node 410 or the second node 420) does not receive some data units, a configured timer may be activated and the receiving side may stand by without aggregation of the received data units before the timer is activated and expires, so that the data processing rate of the PDCP 625 may be reduced.

The embodiment illustrated in FIG. 12B may correspond to the situation in which the electronic device 101 operates in the second operation mode of FIG. 9.

According to various embodiments, the PDCP 511 may operate in the second operation mode such that the size of data stored in the second RLC 523 is not larger than (or equal to) the second configuration value. The PDCP 511 may control the operation of transmitting data to the second RLC 523 such that the size of data stored in the second RLC 523 is not larger than or equal to the second configuration value. For example, the PDCP 511 may stop the operation of transmitting (or routing) data to the second RLC 523 in response to identification that the size of data stored in the second RLC 523 is larger than or equal to the second configuration value (T2_NR). In another example, the PDCP 511 may control the data transmission rate from the PDCP 511 to the second RLC 523 such that the size of data stored in the second RLC 523 is not larger than the second configuration value. For convenience of description, it is assumed that, when the PDCP 511 stops data transmission to the second RLC 523, the second RLC 523 stores data units having sequence numbers 1 to 500. The PDCP 511 may continuously transmit data to the first RLC 521 in response to identification that the size of data stored in the first RLC 521 is smaller than the second configuration value (T2_LTE). When it is identified that the size of data stored in the first RLC 521 is larger than the second configuration value (T2_LTE), the PDCP 511 may stop the operation of transmitting data to the first RCL 521.

According to various embodiments, the PDCP 511 may transmit data through both the primary path and the secondary path in response to identification that the size of data to be transmitted (a sum of the size of data stored in the PDCP 511, the size of data stored in the first RLC 521, and the size of data stored in the second RLC 523) is larger than or equal to the uplink data split threshold value. The PDCP 511 may sequentially transmit the data unit having sequence number 501 to the first RLC 521.

Through the above operation, the electronic device 101 operating in the second operation mode may allow the PDCP 625 of the receiving side (for example, the first node 410 or the second node 420) to sequentially receive data units, and the data processing rate of the PDCP 625 may increase because the preset timer is not activated.

Figure 13:
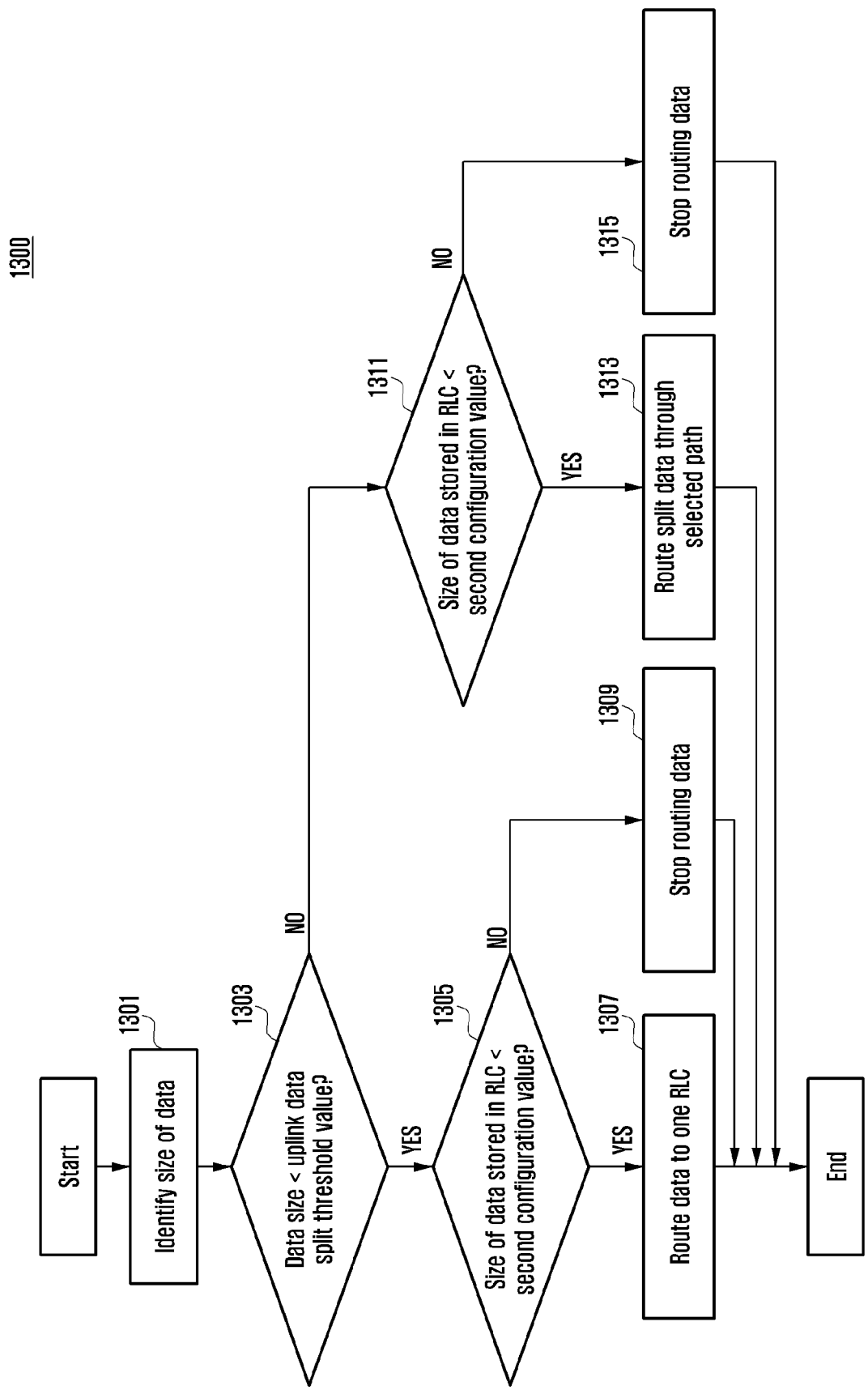
FIG. 13 illustrates a flowchart of the second operation mode in which the electronic device according to various embodiments determines whether to stop data transmission on the basis of the size of data to be transmitted and the size of successfully transmitted data per unit time.

FIG. 13 illustrates a flowchart of the second operation mode in which the electronic device according to various embodiments determines whether to stop data transmission on the basis of the size of data to be transmitted and the size of successfully transmitted data per unit time.

According to various embodiments, in operation 1301, a PDCP (for example, the PDCP entity 511 of FIG. 5) may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, in operation 1303, the PDCP 511 may compare the size of data to be transmitted with the uplink data split threshold value (up_datasplit-threshold).

According to various embodiments, the PDCP 511 may determine to transmit data to the RLC corresponding to the primary path in response to identification that the size of data to be transmitted is equal to or smaller than the uplink data split threshold value.

According to various embodiments, the PDCP 511 may determine to transmit data through a split bearer in response to identification that the size of data to be transmitted is larger than or equal to the uplink data split threshold value. The PDCP 511 may determine to transmit at least some of the data units generated by splitting data to the first RLC (for example, the first RLC 521 of FIG. 5) and others of the data units to the second RLC (for example, the second RLC 523 of FIG. 5).

According to various embodiments, in operation 1305, the PDCP 511 may identify whether the size of data stored in the RLC corresponding to the primary path is equal to or smaller than the second configuration value in response to identification (Yes of operation 1303) that the size of data to be transmitted is equal to or smaller than the uplink data split threshold value.

According to various embodiments, in operation 1307, the PDCP 511 may perform a routing operation of transmitting data to the RLC in response to identification (Yes of operation 1305) that the size of data is smaller than the second configuration value. When the PDCP 511 is transmitting data to the RLC (the first RLC 521 or the second RLC 523), the PDCP 511 may maintain routing of the data.

According to various embodiments, in operation 1309, the PDCP 511 may stop the operation of routing the data to the RLC in response to identification (No of operation 1305) that the size of data is larger than or equal to the second configuration value.

According to various embodiments, the PDCP 511 may stop transmission of data stored in the PDCP 511 to maintain data stored in the RLC (for example, the first RLC 521 or the second RLC 523) to be equal to or smaller than the second configuration value or reduce the data transmission rate from the PDCP 511 to the RLC (for example, the first RLC 521 or the second RLC 523).

According to various embodiments, the PDCP 511 may transmit the data again in response to identification that the size of data stored in the RLC 521 or 523 is reduced to be equal to or smaller than a preset value.

According to various embodiments, in operation 1311, the PDCP 511 may identify whether the size of data stored in the RCL corresponding to a selected path is equal to or smaller than the second configuration value in response to identification (No of operation 1303) that the size of data to be transmitted is larger than or equal to the uplink data split threshold value in the state in which data is transmitted through both the primary path and the secondary path.

According to various embodiments, the PDCP 511 may independently implement the second operation modes of the first RLC 521 and the second RLC 523. For example, the second configuration value corresponding to the first RLC 521 and the second configuration value corresponding to the second RLC 523 may be different from each other. The selected path may be a data transmission path corresponding to the RLC in which the second operation mode is implemented.

According to various embodiments, in operation 1313, the PDCP 511 may perform a routing operation of transmitting data to the RLC corresponding to the selected path in response to identification (Yes of operation 1311) that the size of data is smaller than the second configuration value. When the PDCP 511 is transmitting data to the RLC (the first RLC 521 or the second RLC 523), the PDCP 511 may maintain the data transmission operation.

According to various embodiments, in operation 1315, the PDCP 511 may stop the operation of routing the data to the RLC corresponding to the selected path in response to identification (No of operation 1311) that the size of data is larger than or equal to the second configuration value.

According to various embodiments, the PDCP 511 may stop transmission of data stored in the PDCP 511 to maintain data stored in the RLC (for example, the first RLC 521 or the second RLC 523) to be equal to or smaller than the second configuration value or reduce the data transmission rate from the PDCP 511 to the RLC (for example, the first RLC 521 or the second RLC 523).

According to various embodiments, the PDCP 511 may transmit the data again in response to identification that the data stored in the RLC 521 or 523 is reduced to be equal to or smaller than the second configuration value.

According to various embodiments, the electronic device 101 may selectively use the first operation mode and the second operation mode described with reference to FIGS. 9 to 13. For example, the PDCP 511 may compare the uplink data split threshold value with the first configuration value. The PDCP 511 may operate in the first operation mode in response to identification that the uplink data split threshold value is smaller than the first configuration value. The PDCP 511 may operate in the second operation mode in response to identification that the uplink data split threshold value is larger than the first configuration value.

According to various embodiments, in order to transmit data through a split bearer, the PDCP 511 may transmit at least some of the data units to the first RLC 521 and transmit others of the data units to the second RLC 523. In operation 1303, the PDCP 511 may use the split bearer in response to identification that the size of data to be transmitted is larger than or equal to the uplink data split threshold value. The PDCP 511 may use the operation described with reference to FIGS. 7 to 9 to determine the size of the data unit transmitted to the first RLC 521. The PDCP 511 may determine the size of the data unit transmitted to the first RLC 521 on the basis of uplink grant information of first cellular communication. The PDCP 511 may identify the data processing rates of the first RLC 521 and the second RLC 523 and determine the size of the data unit transmitted to the second RLC 523. The PDCP 511 may assign sequence numbers of data units on the basis of the data processing rates of the first RLC 521 and the second RLC 523.

According to various embodiments, the PDCP 511 may determine the first configuration value on the basis of the average of the size of transmitted data per unit time corresponding to the unit time. The PDCP 511 may determine that the largest value among values of the size of transmitted data per unit time is the second configuration value. For example, the PDCP 511 may identify uplink grant information in every period of 2.5 ms, and determine the average of the size of transmitted data per unit time included in the uplink grant information as the first configuration value. [Table 2] shows a detailed embodiment of determining the first configuration value.

TABLE 2

| Duration time | UL GRANT | First configuration value | Second configuration value |
|---|---|---|---|
| First period (0 s to 2.5 ms) | TBS: 108552 | 108552/8 = 13569 | 108552/8 |
| Second period (2.5 ms to 5 ms) | TBS: 159880 | (108552 + 159880)/ (8 * 2) = 16777 | 159880/8 |
| Third period (5 ms to 7.5 ms) | TBS: 176208 | (108552 + 159880 + 176208)/(8 * 3) = 18527 | 176208/8 |
| Fourth period (7.5 ms to 10 ms) | TBS: 180376 | (108552 + 159880 + 176208 + 180376)/ (8 * 4) = 19532 | 180376/8 |
| Fifth period (10 ms to 12.5 ms) | TBS: 176208 | (159880 + 176208 + 180376 + 176208)/ (8 * 4) = 21646 | 180376/8 |

Figure 14A:
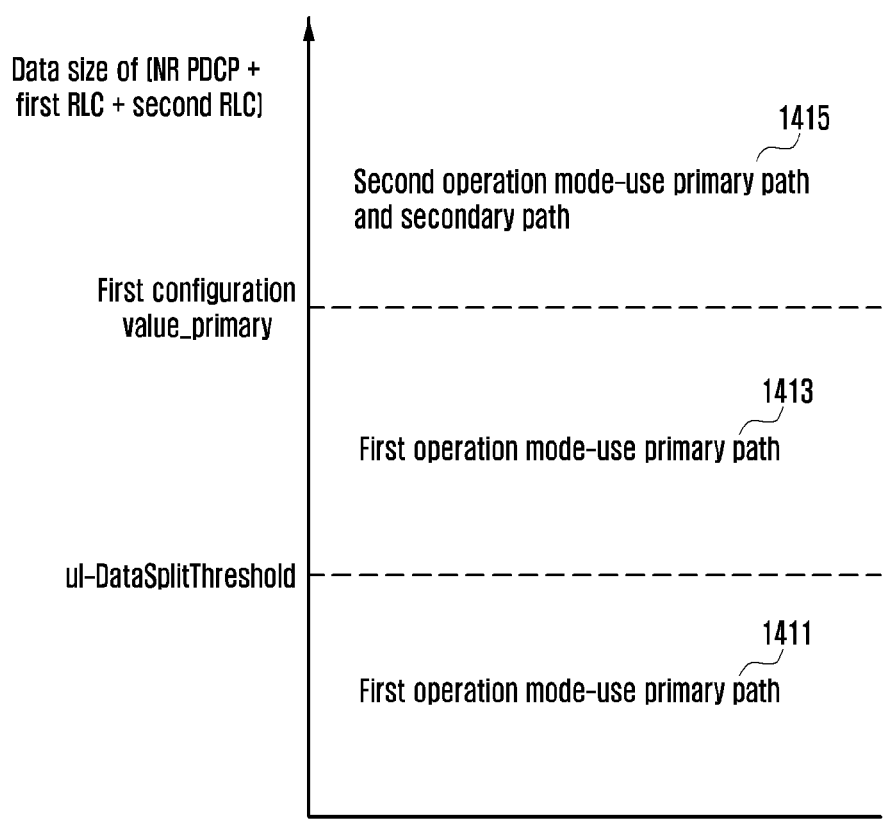
FIG. 14A illustrates an embodiment in which the electronic device according to various embodiments performs one operation mode among the first operation mode and the second operation mode on the basis of the first configuration value.
Figure 14B:
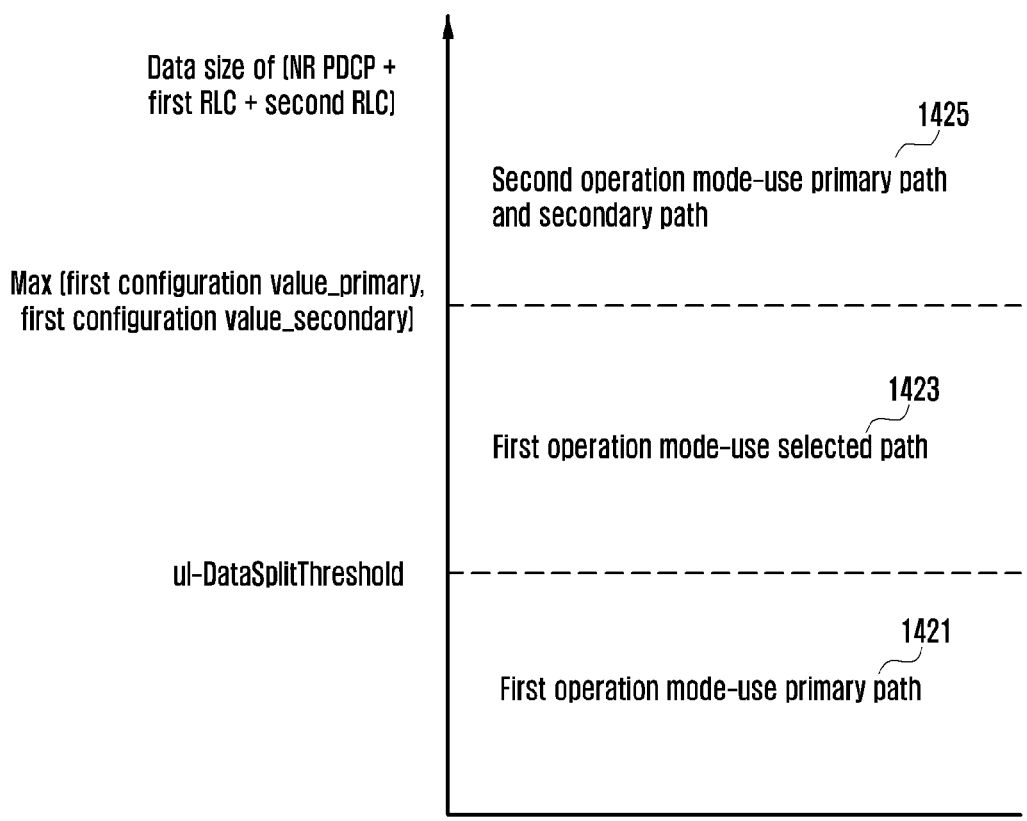
FIG. 14B illustrates an embodiment in which the electronic device according to various embodiments performs one operation mode among the first operation mode and the second operation mode on the basis of the first configuration value.
Figure 14C:
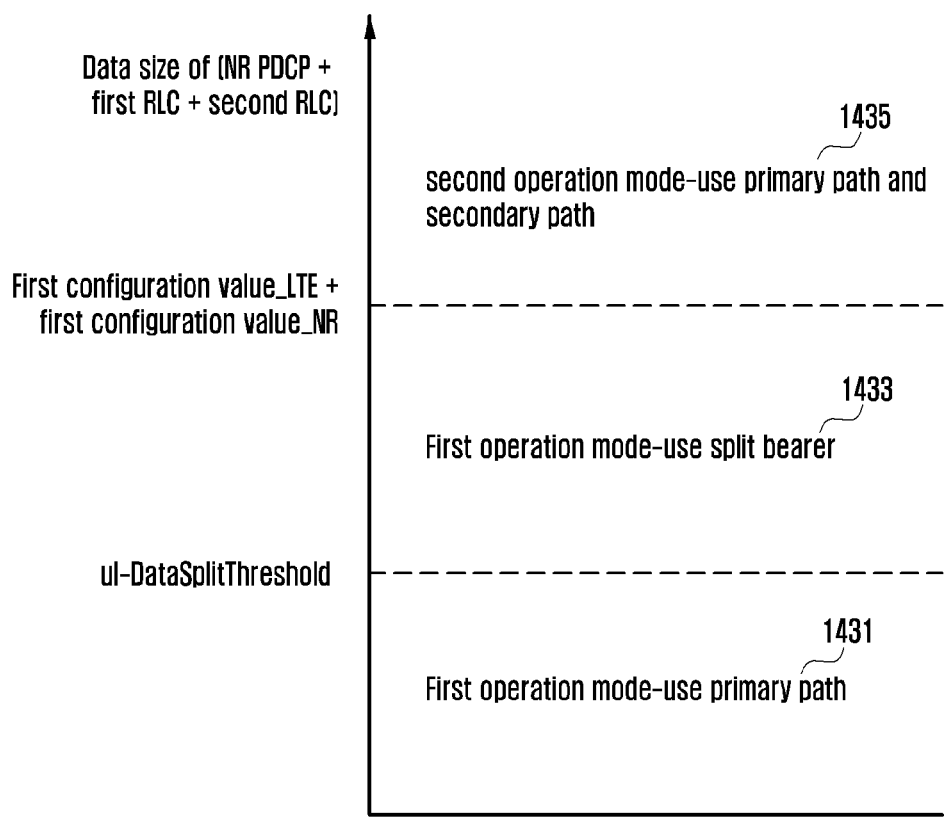
FIG. 14C illustrates an embodiment in which the electronic device according to various embodiments performs one operation mode among the first operation mode and the second operation mode on the basis of the first configuration value.

FIG. 14A illustrates an embodiment in which the electronic device according to various embodiments performs one operation mode among the first operation mode and the second operation mode on the basis of the first configuration value, FIG. 14B illustrates an embodiment in which the electronic device according to various embodiments performs one operation mode among the first operation mode and the second operation mode on the basis of the first configuration value, and FIG. 14C illustrates an embodiment in which the electronic device according to various embodiments performs one operation mode among the first operation mode and the second operation mode on the basis of the first configuration value.

According to various embodiments, the PDCP (for example, the PDCP 511 of FIG. 5) may configure a preset value such that the first configuration value increases as the size of successfully transmitted data per unit time increases. When the communication state of the primary path is good, the PDCP 511 may configure the first configuration value to be larger than the uplink data split threshold value. FIGS. 14A to 14C illustrate the case in which the first configuration value is larger than the uplink data split threshold value.

Referring to FIG. 14A, the PDCP 511 may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, when the size of data to be transmitted is smaller than the uplink data split threshold value (ul-DataSplitThreshold) as indicated by reference numeral 1411, the PDCP 511 may operate in the first operation mode. The PDCP 511 may transmit data to be transmitted to the RLC corresponding to the primary path.

According to various embodiments, when the size of data to be transmitted is larger than the data split threshold value but smaller than the first configuration value as indicated by reference numeral 1413, the PDCP 511 may operate in the first operation mode. The PDCP 511 may transmit data to be transmitted to the RLC corresponding to the primary path.

According to various embodiments, when the size of data to be transmitted is larger than the uplink data split threshold value and larger than the first configuration value as indicated by reference numeral 1415, the PDCP 511 may operate in the second operation mode. The PDCP 511 may transmit data to be transmitted to the RLC corresponding to the primary path and the RLC corresponding to the other path (for example, the secondary path). The PDCP 511 may compare the size of data stored in each of the RLCs (the first RLC 521 and the second RLC 523) with a configured second threshold value and determine whether to stop data transmission to each of the RLCs (the first RLC 521 and the second RLC 523) on the basis of the comparison result.

FIG. 14B illustrates an embodiment in which a data processing rate of the primary path (for example, a data transmission path using first cellular communication) is faster than a data processing rate of the other path (for example, a data transmission path using second cellular communication).

Referring to FIG. 14B, the PDCP 511 may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, when the size of data to be transmitted is smaller than the uplink data split threshold value as indicated by reference numeral 1421, the PDCP 511 may operate in the first operation mode. The PDCP 511 may transmit data to be transmitted to the RLC corresponding to the primary path.

According to various embodiments, when the size of data to be transmitted is larger than the data split threshold value but smaller than the first configuration value as indicated by reference numeral 1423, the PDCP 511 may operate in the first operation mode. The PDCP 511 may transmit data to be transmitted to the RLC corresponding to the primary path or the other path. The PDCP 511 may transmit data to be transmitted to the RLC corresponding to a selected path among the primary path and the other path.

According to various embodiments, the PDCP 511 may identify that the data processing rate of the primary path (for example, the data transmission path using first cellular communication) is faster than the data processing rate of the other path (for example, the data processing rate using second cellular communication), and change the data transmission path. The PDCP 511 may transmit data to the RLC corresponding to the changed transmission path.

According to various embodiments, the PDCP 511 may identify that the data processing rate of the primary path (for example, the data transmission path using first cellular communication) is slower than the data processing rate of the other path (for example, the data processing rate using second cellular communication), and may not change the data transmission path. The PDCP 511 may transmit data to the RLC corresponding to the previous transmission path.

According to various embodiments, the PDCP 511 may compare a larger value (max) among a first configuration value (first configuration value_primary) corresponding to the primary path and a first configuration value (first configuration value secondary) corresponding to the other path with the size of data.

According to various embodiments, when the size of data to be transmitted is larger than the uplink data split threshold value and larger than the first configuration value as indicated by reference numeral 1425, the PDCP 511 may operate in the second operation mode. The PDCP 511 may transmit data to be transmitted to the RLC corresponding to the primary path and the RLC corresponding to the other path. The PDCP 511 may compare the size of data stored in each of the RLCs (the first RLC 521 and the second RLC 523) with a configured second threshold value and determine whether to stop data transmission to each of the RLCs (the first RLC 521 and the second RLC 523) on the basis of the comparison result.

FIG. 14C illustrates another embodiment of the first operation mode.

While FIGS. 14A and 14B illustrate the embodiment in which the PDCP 511 transmits data to one RLC while operating in the first operation mode, FIG. 14C illustrates an embodiment in which the PDCP 511 splits and transmits data to all of the two RLCs while operating in the first operation mode.

Referring to FIG. 14C, the PDCP 511 may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, when the size of data to be transmitted is smaller than the uplink data split threshold value as indicated by reference numeral 1431, the PDCP 511 may operate in the first operation mode. The PDCP 511 may transmit data to be transmitted to the RLC corresponding to the primary path.

According to various embodiments, when the size of data to be transmitted is larger than the data split threshold value but smaller than the first configuration value as indicated by reference numeral 1433, the PDCP 511 may operate in the first operation mode. The PDCP 511 may transmit data to be transmitted to the RLC corresponding to the primary path and the RLC corresponding to the other path.

According to various embodiments, the PDCP 511 may transmit data units to the RLC corresponding to the primary path and the RLC corresponding to the other path. A method by which the PDCP 511 transmits data units to two RLCs may be implemented on the basis of the data processing rate of the RLC, and a detail embodiment thereof has been described with reference to FIGS. 6 to 8.

According to various embodiments, when the size of data to be transmitted is larger than the uplink data split threshold value and larger than the first configuration value as indicated by reference numeral 1435, the PDCP 511 may operate in the second operation mode. The first configuration value may be a sum of the first configuration value corresponding to first cellular communication and the first configuration value corresponding to second cellular communication. The PDCP 511 may transmit data to be transmitted to the RLC corresponding to the primary path and the RLC corresponding to the other path. The PDCP 511 may compare the size of data stored in each of the RLCs (the first RLC 521 and the second RLC 523) with a configured second threshold value and determine whether to stop data transmission to each of the RLCs (the first RLC 521 and the second RLC 523) on the basis of the comparison result.

Figure 15:
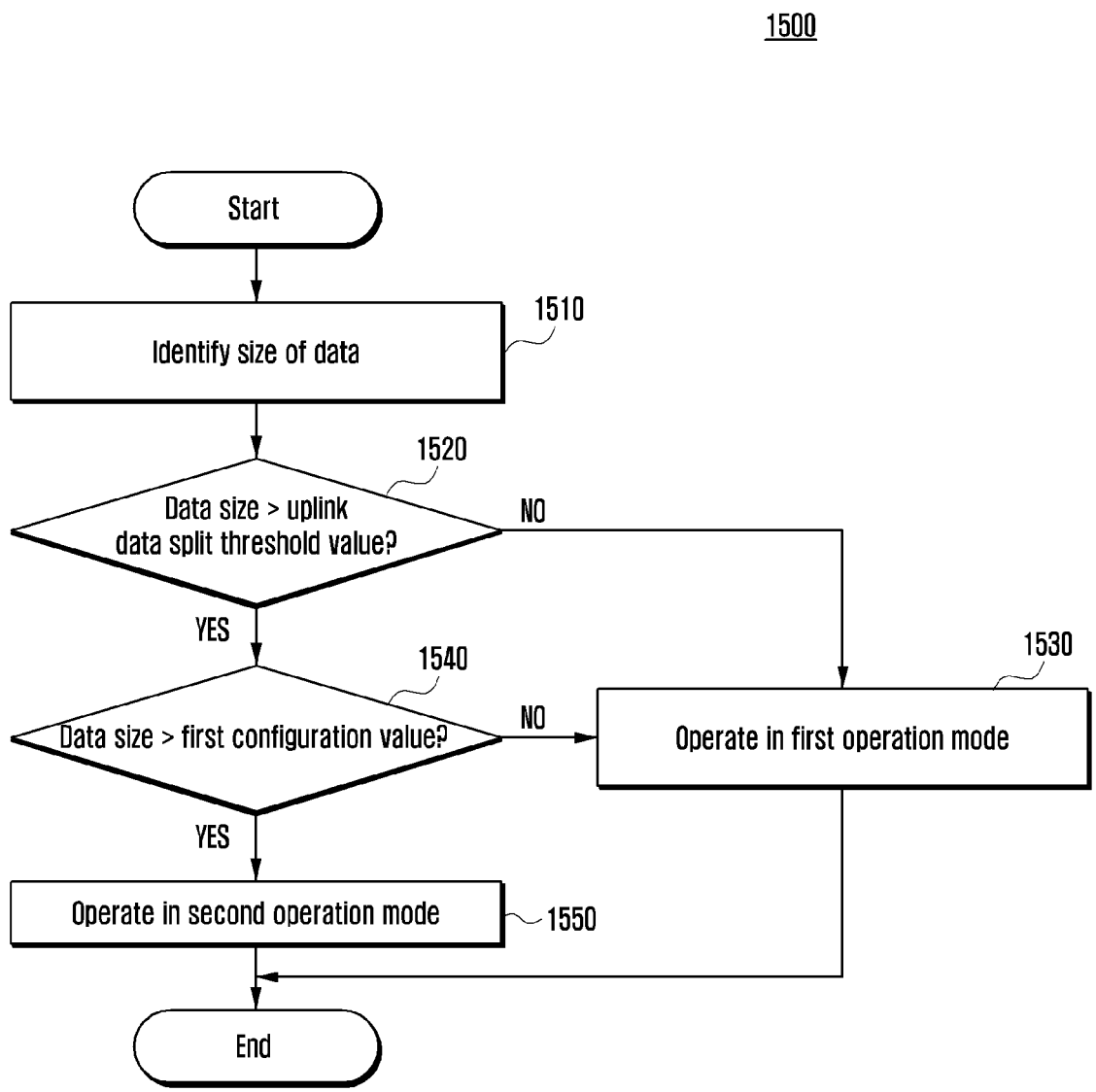
FIG. 15 illustrates a flowchart of a method of operating an electronic device according to various embodiments.

FIG. 15 illustrates a flowchart of a method of operating an electronic device according to various embodiments.

FIG. 15 illustrates the operation of the first operation mode and the second operation mode described with reference to FIGS. 14A to 14C.

According to various embodiments, in operation 1510, a PDCP (for example, the PDCP entity 511 of FIG. 5) may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, in operation 1520, the PDCP 511 may compare the size of data to be transmitted with the uplink data split threshold value (up_datasplitthreshold).

According to various embodiments, in operation 1530, the PDCP 511 may determine to operate in the first operation mode in response to identification (no of operation 1520) that the size of data to be transmitted is equal to or smaller than the uplink data split threshold value.

According to various embodiments, in operation 1540, the PDCP 511 may identify whether the size of data is larger than the first configuration value in response to identification (Yes of operation 1520) that the size of data to be transmitted is larger than the uplink data split threshold value.

According to various embodiments, the PDCP 511 may determine to operate in the first operation mode in operation 1530 in response to identification (No of operation 1540) that the size of data to be transmitted is smaller than the uplink data split threshold value.

According to various embodiments, in operation 1550, the PDCP 511 may determine to operate in the second operation mode in response to identification (Yes of operation 1540) that the size of data to be transmitted is larger than the uplink data split threshold value.

Figure 16:
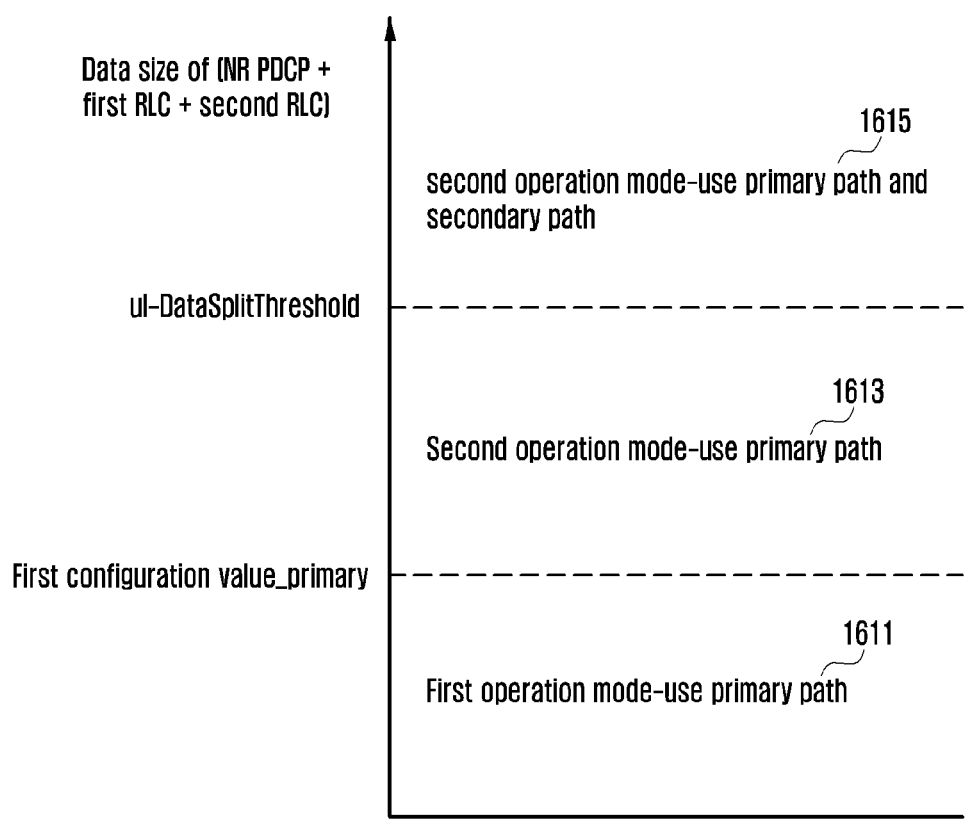
FIG. 16 illustrates an embodiment in which the electronic device according to various embodiments performs one operation mode among the first operation mode and the second operation mode on the basis of the first configuration value.

FIG. 16 illustrates an embodiment in which the electronic device according to various embodiments performs one operation mode among the first operation mode and the second operation mode on the basis of the first configuration value.

According to various embodiments, the PDCP (for example, the PDCP 511 of FIG. 5) may configure a preset value such that the first configuration value increases as the size of successfully transmitted data per unit time increases. When the communication state of the primary path is not good, the PDCP 511 may configure the first configuration value to be smaller than the uplink data split threshold value. FIG. 16 illustrates the case in which the first configuration value is smaller than the uplink data split threshold value.

Referring to FIG. 16, the PDCP 511 may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, when the size of data to be transmitted is smaller than the first configuration value corresponding to the primary path as indicated by reference numeral 1611, the PDCP 511 may operate in the first operation mode. The PDCP 511 may directly transmit data to be transmitted to the RLC corresponding to the primary path such that data stored in the PDCP 511 becomes 0.

According to various embodiments, when the size of data to be transmitted is larger than the first configuration value and smaller than the uplink data split threshold value as indicated by reference numeral 1613, the PDCP 511 may operate in the second operation mode. The PDCP 511 may transmit data to be transmitted to the RLC corresponding to the primary path. The PDCP 511 may compare the size of data stored in the RLC corresponding to the primary path with a second configuration value, and stop data transmission or control the rate on the basis of the comparison result.

According to various embodiments, when the size of data to be transmitted is larger than the uplink data split threshold value as indicated by reference numeral 1615, the PDCP 511 may operate in the second operation mode. The PDCP 511 may transmit data to be transmitted to the RLC corresponding to the primary path and the RLC corresponding to the other path. The PDCP 511 may compare the size of data stored in each of the RLCs (the first RLC 521 and the second RLC 523) with a configured second threshold value and determine whether to stop data transmission to each of the RLCs (the first RLC 521 and the second RLC 523) on the basis of the comparison result.

Figure 17:
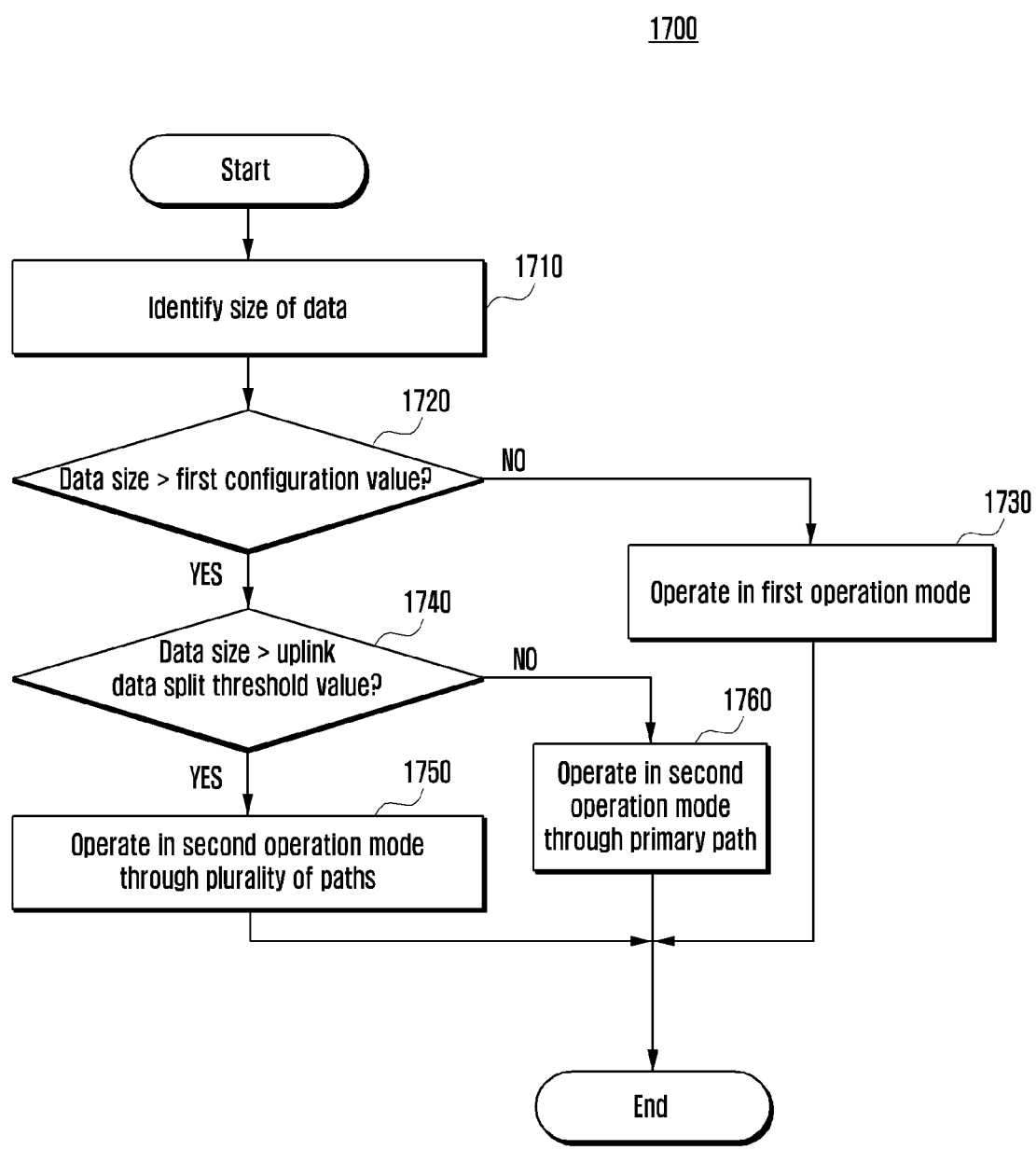
FIG. 17 illustrates a flowchart of a method of operating the electronic device according to various embodiments.

FIG. 17 illustrates a flowchart of a method 1700 of operating the electronic device according to various embodiments.

FIG. 17 illustrates the operation of the first operation mode and the second operation mode described with reference to FIG. 16.

According to various embodiments, in operation 1710, a PDCP (for example, the PDCP entity 511 of FIG. 5) may identify the size of data to be transmitted. The size of data to be transmitted may be a value considering the size of data temporarily stored in the PDCP 511, the size of data temporarily stored in the first RLC 521, and the size of data temporarily stored in the second RLC 523.

According to various embodiments, in operation 1720, the PDCP 511 may compare the size of data to be transmitted with the first configuration value.

According to various embodiments, in operation 1730, the PDPC 511 may operate in the first operation mode in response to identification (No of operation 1720) that the size of data to be transmitted is smaller than the first configuration value. The PDCP 511 may directly transmit data to be transmitted to the RLC corresponding to the primary path such that data stored in the PDCP 511 becomes 0.

According to various embodiments, in operation 1740, the PDCP 511 may compare the size of data with the uplink data split threshold value in response to identification (Yes of operation 1720) that the size of data to be transmitted is larger than the first configuration value.

According to various embodiments, in operation 1750, the PDCP 511 may operate in the second operation mode using a plurality of paths (for example, the primary path and the other path) in response to identification (Yes of operation 1740) that the size of data is larger than the uplink data split threshold value. The PDCP 511 may compare the size of data stored in each of the RLCs (the first RLC 521 and the second RLC 523) with a configured second threshold value and determine whether to stop data transmission to each of the RLCs (the first RLC 521 and the second RLC 523) on the basis of the comparison result.

According to various embodiments, in operation 1760, the PDCP 511 may operate in the second operation mode using one path (for example, the primary path) in response to identification (No of operation 1740) that the size of data is smaller than the uplink data split threshold value. The PDCP 511 may transmit data to be transmitted to the RLC corresponding to the primary path. The PDCP 511 may compare the size of data stored in the RLC corresponding to the primary path with a second configuration value, and stop data transmission or control the rate on the basis of the comparison result.

An electronic device according to various embodiments may include: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first RLC configured to split data received from the PDCP and transmit the split data to a first MAC corresponding to the first cellular communication; and a second RLC configured to split data received from the PDCP and transmit the split data to a second MAC corresponding to the second cellular communication, wherein the PDCP is configured to receive data to be transmitted through the first cellular communication and/or the second cellular communication from the application processor, transmit the data to at least one of the first RLC or the second RLC, and stop transmitting the data to the RLC receiving the data, based on a result of comparison between the size of data temporarily stored in the RLC receiving the data with a first configuration value.

In the electronic device according to various embodiments, the PDCP may be configured to determine the first configuration value, based on the size of successfully transmitted data per unit time through the first cellular communication or the second cellular communication.

In the electronic device according to various embodiments, the PDCP may be configured to determine the first configuration value, based on the size of data transmitted to the RLC receiving the data from the PDCP.

In the electronic device according to various embodiments, the PDCP may be configured to start again transmitting the data to the RLC receiving the data in response to identification that the size of data temporarily stored in the RCL receiving the data is smaller than the first configuration value.

In the electronic device according to various embodiments, the PDCP may be configured to compare a value related to the size of data with an uplink data split threshold value (ul-DataSplitThreshold) received from one of the first node and the second node, and transmit at least some of the data to the first RLC and others of the data to the second RLC in response to identification that the value related to the size of data is larger than the uplink data split threshold value.

In the electronic device according to various embodiments, the value related to the size of data may include a value indicating a sum of the size of data temporarily stored in the PDCP, the first RLC, and the second RLC.

In the electronic device according to various embodiments, the PDCP may be configured to stop transmitting the data to the first RLC in response to identification that the size of data temporarily stored in the first RLC is larger than a value related to the size of transmitted data per unit time through the first cellular communication, and stop transmitting the data to the second RLC in response to identification that the size of data temporarily stored in the second RLC is larger than the value related to the size of transmitted data per unit time through the first cellular communication.

In the electronic device according to various embodiments, the PDCP may be configured to start again transmitting the data to the first RLC in response to identification that the size of data temporarily stored in the first RLC is smaller than the first configuration value, or start again transmitting the data to the second RLC in response to identification that the size of data temporarily stored in the second RLC is smaller than the first configuration value.

In the electronic device according to various embodiments, the PDCP may be configured to compare the size of data temporarily stored in the RLC receiving the data with the first configuration value, and stop transmitting the data to the RLC receiving the data in response to identification that the size of data temporarily stored in the RLC receiving the data is larger than the first configuration value.

In the electronic device according to various embodiments, the first configuration value may be determined based on a quality state of the first cellular communication or the second cellular communication.

An electronic device according to various embodiments may include: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first RLC configured to split data received from the PDCP and transmit the split data to a first MAC corresponding to the first cellular communication; and a second RLC configured to split data received from the PDCP and transmit the split data to a second MAC corresponding to the second cellular communication, wherein the PDCP is configured to identify the size of data temporarily stored in the PDCP, the first RLC, and the second RLC, and operate in one operation mode among a first operation mode in which the data temporarily stored in the PDCP is transmitted to the first RLC and the second RLC so that no data is stored in the PDCP and a second operation mode in which the data temporarily stored in the PDCP is not transmitted so that the size of the data temporarily stored in the first RLC or the second RLC is not larger than a second configuration value, based on a result of comparison between the identified size of the data and a first configuration value.

In the electronic device according to various embodiments, the PDCP may be configured to operate in the first operation mode in response to identification that the identified size of the data is smaller than the first configuration value, and operate in the second operation mode in response to identification that the identified size of the data is larger than the first configuration value.

In the electronic device according to various embodiments, when the first configuration value is larger than or equal to an uplink data split threshold value (ul-DataSplitThreshold), the PDCP may be configured to transmit the data temporarily stored in the PDCP to one of the first RLC and the second RLC in response to identification that the identified size of the data is larger than the uplink data split threshold value and smaller than the first configuration value.

In the electronic device according to various embodiments, the PDCP may be configured to compare the first configuration value corresponding to the first RLC with the first configuration value corresponding to the second RLC, and transmit the data temporarily stored in the PDCP to an RLC corresponding to a larger configuration value among the first RLC and the second RLC.

In the electronic device according to various embodiments, when the first configuration value is smaller than an uplink data split threshold value (ul-DataSplitThreshold), the PDCP may be configured to transmit the data temporarily stored in the PDCP to one of the first RLC and the second RLC in response to identification that the identified size of the data is larger than the first configuration value and smaller than the uplink data split threshold value.

An electronic device according to various embodiments may include: at least one communication processor; and an application processor configured to transmit data to be transmitted through first cellular communication and/or second cellular communication to the at least one communication processor, wherein the at least one communication processor includes: a packet data convergence protocol (PDCP) configured to support a split bearer for transmitting split data generated by splitting the data to a first node corresponding to the first cellular communication and a second node corresponding to the second cellular communication; a first radio layer control (RLC) configured to split data received from the PDCP and transmit the split data to a first media access control (MAC) corresponding to the first cellular communication; and a second RLC configured to split data received from the PDCP and transmit the split data to a second MAC corresponding to the second cellular communication, wherein the PDCP is configured split data received from the application processor into data units having a preset size, identify a data processing rate of the first RLC and a data processing rate of the second RLC, and distribute the data units to the first RLC and the second RLC, based on the data processing rate of the first RLC and the data processing rate of the second RLC.

In the electronic device according to various embodiments, the PDCP may be configured to determine a number of data units to be distributed to the first RLC, based on uplink grant information of the first cellular communication.

In the electronic device according to various embodiments, the PDCP may be configured to determine a number of data units to be distributed to the second RLC, based on the number of data units to be distributed to the first RLC, the data processing rate of the first RLC, and the data processing rate of the second RLC.

In the electronic device according to various embodiments, the PDCP may be configured to distribute a larger number of data units to an RLC having a faster data processing rate among the first RLC and the second RLC.

In the electronic device according to various embodiments, the PDCP may be configured to designate transmission sequences of the data units, based on the data processing rate of the first RLC and the data processing rate of the second RLC.

In the electronic device according to various embodiments, the PDCP may be configured to transmit the data units to the first RLC and the second RLC so that the size of data temporarily stored in the PDCP becomes equal to or smaller than a preset value, based on a result of comparison between a value related to the size of data received from the application processor and a value related to the size of data transmitted from the PDCP to the first RLC and the second RLC.

In the electronic device according to various embodiments, the PDCP may be configured to transmit the data units through a transmission path corresponding to one of the first RLC and the second RLC in response to identification that the size of data received from the application processor is larger than an uplink data split threshold value (ul-datasplitthreshold) received from one of the first node and the second node and smaller than a value related to the size of transmitted data per unit time.

In the electronic device according to various embodiments, the PDCP may be configured to transmit the data units through all of a transmission path corresponding to the first RLC and a transmission path corresponding to the second RLC in response to identification that the size of data received from the application processor is larger than an uplink data split threshold value (ul-datasplitthreshold) received from one of the first node and the second node and larger than a value related to the size of transmitted data per unit time.

In the electronic device according to various embodiments, the PDCP may be configured to transmit the data units through one of a transmission path corresponding to the first RLC and a transmission path corresponding to the second RLC in response to identification that the size of data received from the application processor is smaller than an uplink data split threshold value (ul-datasplitthreshold) received from one of the first node or the second node and larger than a value related to the size of transmitted data per unit time, smaller than the uplink data split threshold value.

In the electronic device according to various embodiments, the PDCP may be configured to control the size of data temporarily stored in the RLC corresponding to the used path to be not larger than a preset value.

In the electronic device according to various embodiments, the PDCP may be configured to stop transmitting the data to the first RLC in response to identification that the size of data temporarily stored in the first RLC is larger than or equal to a value related to the size of transmitted data per unit time through the first cellular communication while some of the data units are transmitted to the first RLC.

In the electronic device according to various embodiments, the PDCP may be configured to start again transmitting the data units to the first RLC in response to identification that the size of data temporarily stored in the first RLC is smaller than the value related to transmitted data per unit time.

Figure 18:
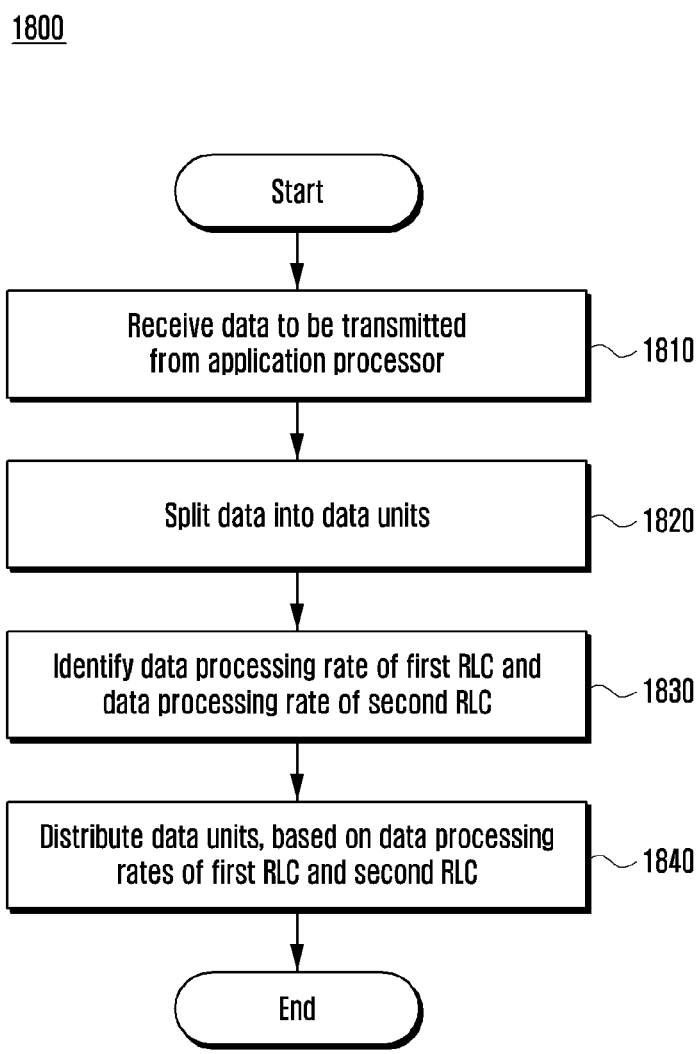
FIG. 18 illustrates a flowchart of a method of operating the electronic device according to various embodiments.

FIG. 18 illustrates a flowchart of a method 1800 of operating the electronic device according to various embodiments.

According to various embodiments, in operation 1810, a PDCP (for example, the PDCP 511 of FIG. 5) may receive data transmitted by an application processor (for example, the processor 120 of FIG. 1).

According to various embodiments, in operation 1820, the PDCP 511 may split the received data into a plurality of data units. The size of the split data units may be the same as each other.

According to various embodiments, in operation 1830, the PDCP 511 may identify a data processing rate of a first RLC (for example, the first RLC 521 of FIG. 5) and a data processing rate of a second RLC (for example, the second RLC 523 of FIG. 5).

According to various embodiments, the data processing rate of the first RLC 521 may be the size of data which the first RLC 521 transmits to a first MAC (for example, the first MAC 531 of FIG. 5) for a predetermined time. The data processing rate of the second RLC 523 may be the size of data which the second RLC 523 transmits to a second MAC (for example, the second MAC 533 of FIG. 5) for a predetermined time.

According to various embodiments, in operation 1840, the PDCP 511 may distribute the data units to the first RLC 521 and the second RLC 523 on the basis of the data processing rate of the first RLC 521 and the data processing rate of the second RLC 523.

According to various embodiments, the PDCP 511 may determine the size of the data unit transmitted to the first RLC 521 on the basis of uplink grant information of first cellular communication. The PDCP 511 may identify the data processing rates of the first RLC 521 and the second RLC 523 and determine the size of the data unit transmitted to the second RLC 523. The PDCP 511 may assign sequence numbers of data units on the basis of the data processing rates of the first RLC 521 and the second RLC 523.

A method of operating an electronic device according to various embodiments may include: an operation of receiving data to be transmitted to one or more of a first node for performing first cellular communication with the electronic device or a second node for performing second cellular communication with the electronic device from an application processor, by a communication processor; an operation of transmitting the data to at least one of a first RLC or a second RLC; and an operation of stopping transmitting the data to the RLC receiving the data, based on a result of comparison between the size of data temporarily stored in the RLC receiving the data with a first configuration value while the data is transmitted.

The method of operating the electronic device according to various embodiments may further include an operation of determining the first configuration value, based on the size of successfully transmitted data per unit time through the first cellular communication or the second cellular communication.

In the method of operating the electronic device according to various embodiments, the operation of determining the first configuration value may include an operation of determining the first configuration value, based on the size of data transmitted to the RLC receiving the data from the PDCP.

The method of operating the electronic device according to various embodiments may further include an operation of starting again transmitting the data to the RLC receiving the data in response to identification that the size of data temporarily stored in the RLC receiving the data is smaller than the first configuration value.

The method of operating the electronic device according to various embodiments may further include an operation of comparing a value related to the size of data with an uplink data split threshold value (ul-DataSplitThreshold) received from one of the first node and the second node; and an operation of transmitting at least some of the data to the first RLC and transmitting others of the data to the second RLC in response to identification that the value related to the size of the data is larger than the uplink data split threshold value, wherein the value related to the size of the data includes a value indicating a sum of the size of data temporarily stored by the PDCP, the first RLC, and the second RLC.

A method of operating an electronic device according to various embodiments may include: an operation of receiving data to be transmitted to one or more of a first node for performing first cellular communication with the electronic device or a second node for performing second cellular communication with the electronic device from an application processor, by a communication processor; an operation of splitting the data into data units having a preset size, by a packet data convergence protocol (PDCP) implemented in the communication processor; an operation of identifying a data processing rate of a first radio layer control (RLC)

configured to split data received from the PDCP and transmit the split data to a first media access control (MAC) corresponding to the first cellular communication and identifying a data processing rate of a second RLC configured to split the data received from the PDCP and transmit the split data to a second MAC corresponding to the second cellular communication; and an operation of distributing data units to the first RLC and the second RLC, based on the data processing rate of the first RLC and the data processing rate of the second RLC.

In the method of operating the electronic device according to various embodiments, the operation of distributing the data units may include an operation of determining a number of data units to be distributed to the first RLC, based on uplink grant information of the first cellular communication.

In the method of operating the electronic device according to various embodiments, the operation of distributing the data units may include an operation of determining a number of data units to be distributed to the second RLC, based on the number of data units to be distributed to the first RLC, the data processing rate of the first RLC, and the data processing rate of the second RLC.

In the method of operating the electronic device according to various embodiments, the operation of distributing the data units may include an operation of distributing a larger number of data units to an RLC having a faster data processing rate among the first RLC and the second RLC.

The method of operating the electronic device according to various embodiments may further include an operation of designating transmission sequences of the data units, based on the data processing rate of the first RLC and the data processing rate of the second RLC.

In the method of operating the electronic device according to various embodiments, the operation of distributing the data units may include an operation of transmitting the data units to the first RLC and the second RLC so that the size of data stored in the PDCP becomes equal to or smaller than a preset value, based on a result of comparison between a value related to the size of data received from the application processor and a value related to the size of data transmitted per unit time from the PDCP to the first RLC and the second RLC.

The method of operating the electronic device according to various embodiments may further include an operation of stopping transmitting the data to the first RLC in response to identification that the size of data temporarily stored in the first RLC is larger than or equal to a value related to the size of transmitted data per unit time through the first cellular communication while some of the data units are transmitted to the first RLC.

The method of operating the electronic device according to various embodiments may further include an operation of transmitting again the data units to the first RLC in response to identification that the size of data temporarily stored in the first RLC is smaller than the value related to the size of data transmitted per unit time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
at least one communication processor; and
an application processor configured to transmit data to be transmitted through first cellular communication and/or second cellular communication to the at least one communication processor,
wherein the at least one communication processor comprises:
a packet data convergence protocol (PDCP) configured to support a split bearer for transmitting split data generated by splitting the data to a first node corresponding to the first cellular communication and a second node corresponding to the second cellular communication;
a first radio layer control (RLC) configured to split first data received from the PDCP and transmit the split first data to a first media access control (MAC) corresponding to the first cellular communication; and
a second RLC configured to split second data received from the PDCP and transmit the split second data to a second MAC corresponding to the second cellular communication,
wherein the PDCP is configured to split data received from the application processor into data units having a preset size, identify a data processing rate of the first RLC and a data processing rate of the second RLC, and distribute the data units to the first RLC and the second RLC, based on the data processing rate of the first RLC and the data processing rate of the second RLC,
wherein the PDCP is further configured to:
assign a sequence number to each of the data units based on the data processing rate of the first RLC and the data processing rate of the second RLC such that the data units are sequentially received, in an order of the sequence numbers respectively assigned to the data units, from a first node and a second node corresponding to a split-bearer.

2. The electronic device of claim 1, wherein the PDCP is configured to determine a number of data units to be distributed to the first RLC, based on uplink grant information of the first cellular communication.

3. The electronic device of claim 2, wherein the PDCP is configured to determine a number of data units to be distributed to the second RLC, based on the number of data units to be distributed to the first RLC, the data processing rate of the first RLC, and the data processing rate of the second RLC.

4. The electronic device of claim 1, wherein the PDCP is configured to distribute a larger number of data units to an RLC having a faster data processing rate among the first RLC and the second RLC.

5. The electronic device of claim 1, wherein the PDCP is configured to designate transmission sequences of the data units, based on the data processing rate of the first RLC and the data processing rate of the second RLC.

6. The electronic device of claim 1, wherein the PDCP is configured to transmit the data units to the first RLC and the second RLC so that a size of data stored in the PDCP becomes equal to or smaller than a preset value, based on a result of comparison between a value related to a size of data received from the application processor and a value related to a size of data transmitted per unit time from the PDCP to the first RLC and the second RLC.

7. The electronic device of claim 6, wherein the PDCP is configured to transmit the data units through a transmission path corresponding to one of the first RLC and the second RLC in response to identification that a size of the data received from the application processor is larger than an uplink data split threshold value (ul-datasplitthreshold) received from one of the first node and the second node and smaller than a value related to the size of data transmitted per unit time.

8. The electronic device of claim 6, wherein the PDCP is configured to transmit the data units through all of a transmission path corresponding to the first RLC and a transmission path corresponding to the second RLC in response to identification that the size of the data received from the application processor is larger than an uplink data split threshold value (ul-datasplitthreshold) received from one of the first node and the second node and larger than a value related to the size of data transmitted per unit time.

9. The electronic device of claim 6, wherein the PDCP is configured to transmit the data units through one of a transmission path corresponding to the first RLC or a transmission path corresponding to the second RLC in response to identification that the size of the data received from the application processor is smaller than an uplink data split threshold value (ul-datasplitthreshold) received from one of the first node and the second node and larger than a value related to the size of data transmitted per unit time, smaller than the uplink data split threshold value.

10. The electronic device of claim 9, wherein the PDCP controls a size of data temporarily stored in the RLC corresponding to the transmission path used to be not larger than a preset value.

11. The electronic device of claim 1, wherein the PDCP is configured to stop transmitting the data to the first RLC in response to identification that a size of data temporarily stored in the first RLC is larger than or equal to a value related to a size of data transmitted per unit time through the first cellular communication while some of the data units are transmitted to the first RLC.

12. The electronic device of claim 11, wherein the PDCP is configured to start again transmitting the data units to the first RLC in response to identification that the size of the data temporarily stored in the first RLC is smaller than the value related to the size of data transmitted per unit time.

13. A method of operating an electronic device, the method comprising:
- receiving, by a communication processor, data to be transmitted from an application processor to one or more of a first node for performing first cellular communication with the electronic device or a second node for performing second cellular communication with the electronic device;
- splitting the data into data units having a preset size, by a packet data convergence protocol (PDCP) implemented in the communication processor;
- identifying a data processing rate of a first radio layer control (RLC) configured to split first data received from the PDCP and transmit the split first data to a first media access control (MAC) corresponding to the first cellular communication and identifying a data processing rate of a second RLC configured to split second data received from the PDCP and transmit the split second data to a second MAC corresponding to the second cellular communication; and
- distributing data units to the first RLC and the second RLC, based on the data processing rate of the first RLC and the data processing rate of the second RLC,
- wherein the method is further comprising:
  - assigning a sequence number to each of the data units based on the data processing rate of the first RLC and the data processing rate of the second RLC such that the data units are sequentially received, in an order of the sequence numbers respectively assigned to the data units, from a first node and a second node corresponding to a split-bearer.

14. The method of claim 13, wherein the distributing of the data units comprises determining a number of data units to be distributed to the first RLC, based on uplink grant information of the first cellular communication.

15. The method of claim 14, wherein the distributing of the data units further comprises determining a number of data units to be distributed to the second RLC, based on the number of data units to be distributed to the first RLC, the data processing rate of the first RLC, and the data processing rate of the second RLC.

16. The method of claim 13, wherein the distributing of the data units comprises distributing a larger number of data units to an RLC having a faster data processing rate among the first RLC and the second RLC.

17. The method of claim 13, further comprising designating transmission sequences of the data units, based on the data processing rate of the first RLC and the data processing rate of the second RLC.

18. The method of claim 13, wherein the splitting of the data comprises transmitting the data units to the first RLC and the second RLC so that a size of data stored in the PDCP becomes equal to or smaller than a preset value, based on a result of comparison between a value related to the size of data received from the application processor and a value related to a size of data transmitted per unit time from the PDCP to the first RLC and the second RLC.

19. The method of claim 13, further comprising stopping transmitting the data to the first RLC in response to identification that a size of data temporarily stored in the first RLC is larger than or equal to a value related to the size of data transmitted per unit time through the first cellular communication while some of the data units are transmitted to the first RLC.

20. The method of claim 19, further comprising transmitting again the data units to the first RLC in response to identification that the size of data temporarily stored in the first RLC is smaller than the value related to the size of data transmitted per unit time.

* * * * *